(12) United States Patent
Sasaki

(10) Patent No.: US 6,742,242 B2
(45) Date of Patent: Jun. 1, 2004

(54) THIN FILM MAGNETIC HEAD AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/971,917

(22) Filed: Oct. 9, 2001

(65) Prior Publication Data

US 2002/0013995 A1 Feb. 7, 2002

Related U.S. Application Data

(62) Division of application No. 09/292,946, filed on Apr. 16, 1999, now Pat. No. 6,317,289.

(30) Foreign Application Priority Data

Apr. 17, 1998 (JP) .............................................. 10-107457
Apr. 28, 1998 (JP) ........................................... 10-119133

(51) Int. Cl.⁷ .......................... G11B 5/127; H04R 31/00
(52) U.S. Cl. .............. 29/603.15; 29/603.07; 29/603.16; 29/603.18; 29/605; 360/123; 360/126; 360/317; 216/39; 216/41; 451/5; 451/41
(58) Field of Search ....................... 29/603.07, 603.11, 29/603.13, 2, 603.16, 603.18, 605; 360/121, 123, 126, 317; 216/39, 41; 451/5, 41

(56) References Cited

U.S. PATENT DOCUMENTS

| | | | | |
|---|---|---|---|---|
| 3,908,194 A | * | 9/1975 | Romankiw .................. 360/317 |
| 5,313,356 A | * | 5/1994 | Ohkubo et al. ............. 360/126 |
| 5,722,157 A | * | 3/1998 | Shouji et al. ............. 29/603.14 |
| 5,764,446 A | * | 6/1998 | Seagle ........................ 360/322 |
| 5,907,459 A | * | 5/1999 | Shouji et al. ............... 360/322 |
| 5,935,644 A | * | 8/1999 | Heim et al. ................. 427/116 |
| 6,104,576 A | * | 8/2000 | Santini ....................... 360/126 |
| 6,111,724 A | * | 8/2000 | Santini ....................... 360/126 |
| 6,172,848 B1 | | 1/2001 | Santini |

FOREIGN PATENT DOCUMENTS

| | | | |
|---|---|---|---|
| JP | A 64-76414 | 3/1989 |
| JP | A 7-262519 | 10/1995 |
| JP | 11-102506 | 4/1999 |

* cited by examiner

Primary Examiner—A. Dexter Tugbang
Assistant Examiner—Paul D Kim
(74) Attorney, Agent, or Firm—Oliff & Berridge, PLC

(57) ABSTRACT

A method of manufacturing a combination type thin film magnetic head having an inductive type thin film magnetic head supported by a substrate including forming a first magnetic layer extending from an air bearing surface and forming an insulating layer on a surface of a portion of the first magnetic layer such that the insulating layer extends at least the air bearing surface and includes a ⊐-shaped cut-out portion.

10 Claims, 21 Drawing Sheets

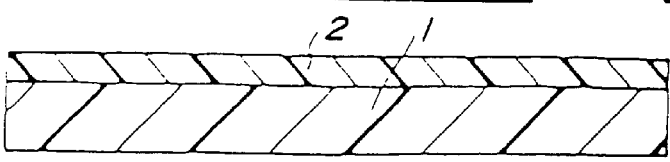 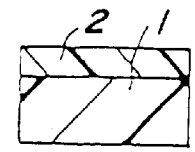
FIG._1A PRIOR ART    FIG._1B
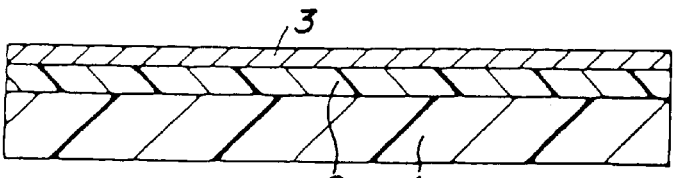 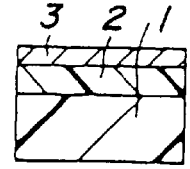
FIG._2A PRIOR ART    FIG._2B
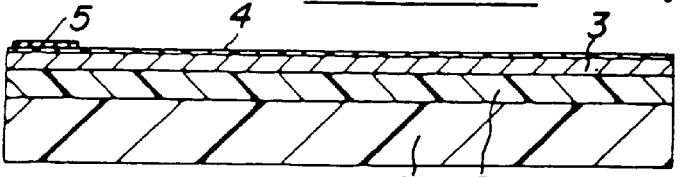 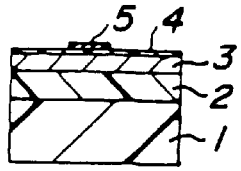
FIG._3A PRIOR ART    FIG._3B
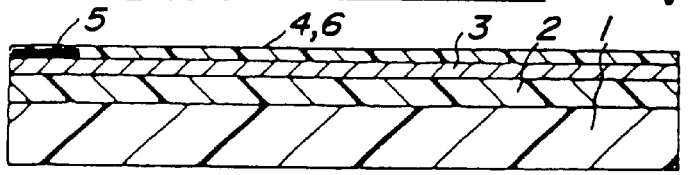 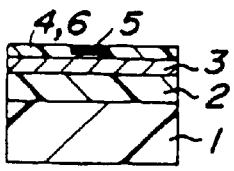
FIG._4A PRIOR ART    FIG._4B
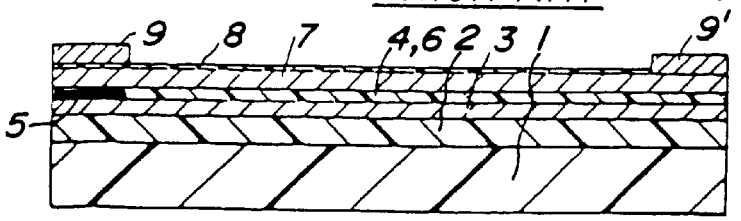 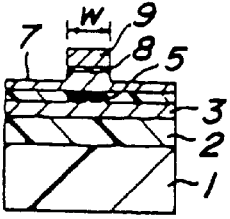
FIG._5A PRIOR ART    FIG._5B
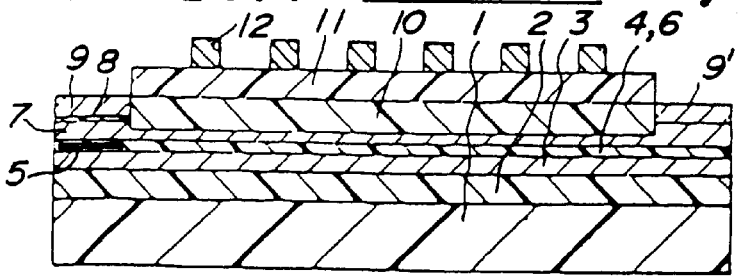 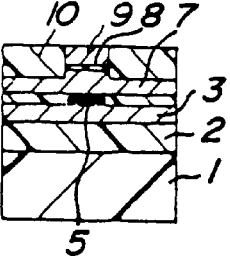
FIG._6A PRIOR ART    FIG._6B

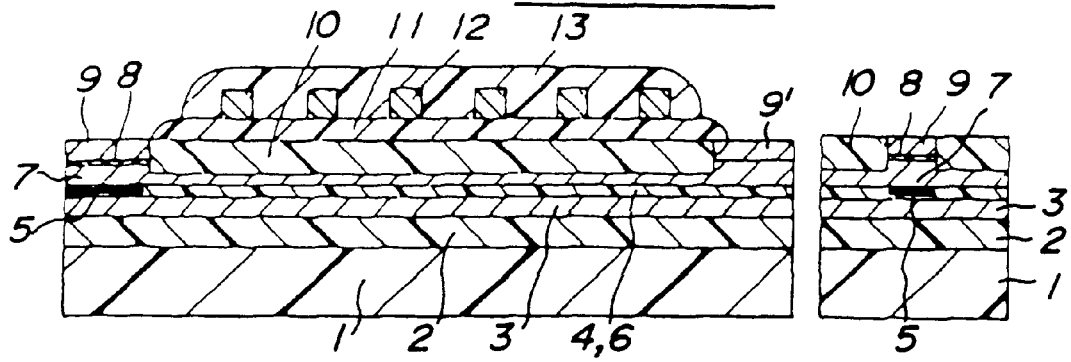
FIG_7A  FIG_7B
PRIOR ART
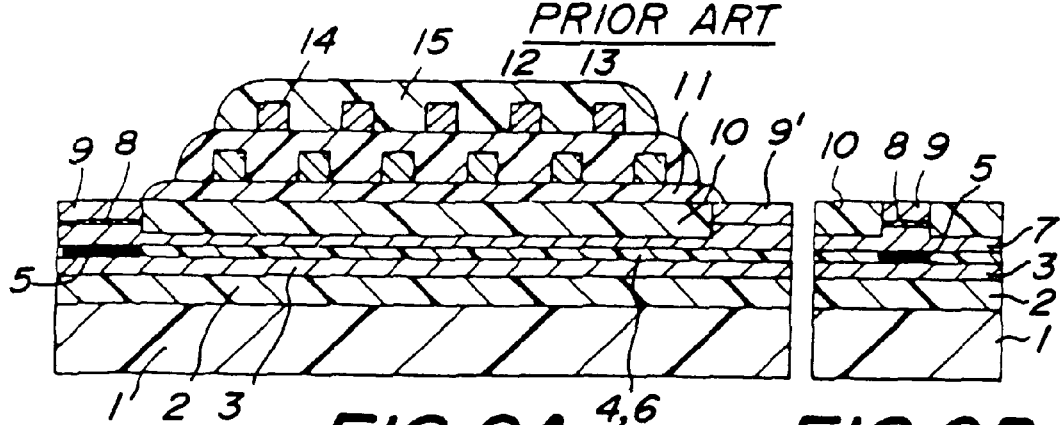
FIG.8A  FIG.8B
PRIOR ART
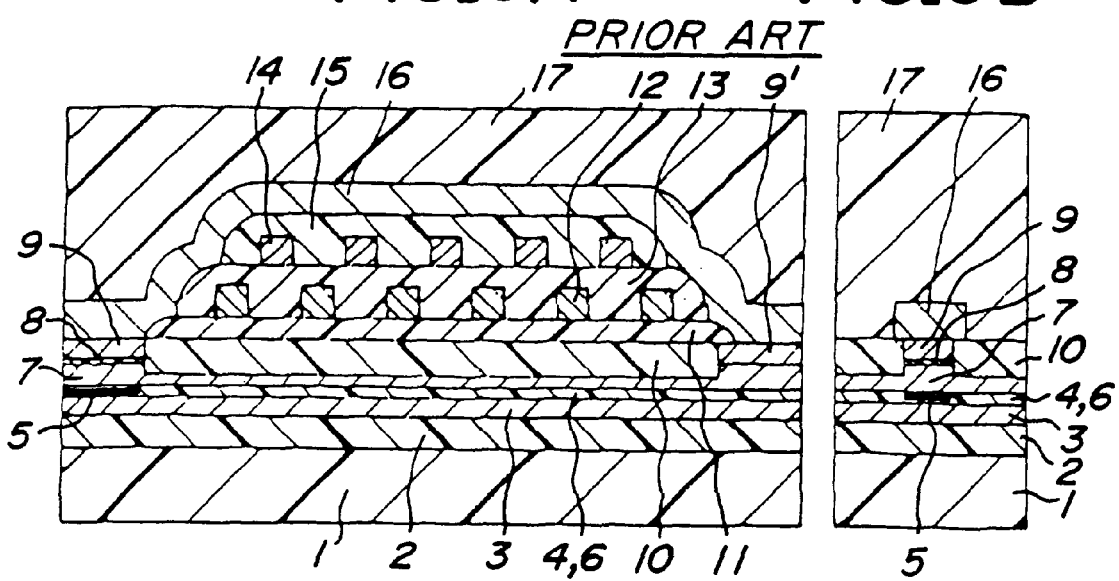
FIG.9A  FIG.9B
PRIOR ART

FIG._12
PRIOR ART

FIG._15A
PRIOR ART
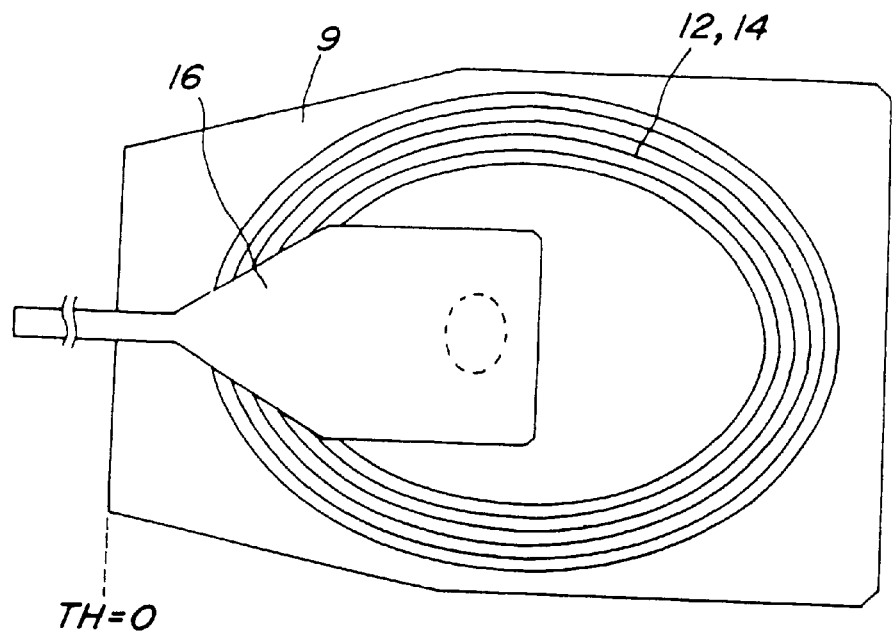
FIG._15B
PRIOR ART
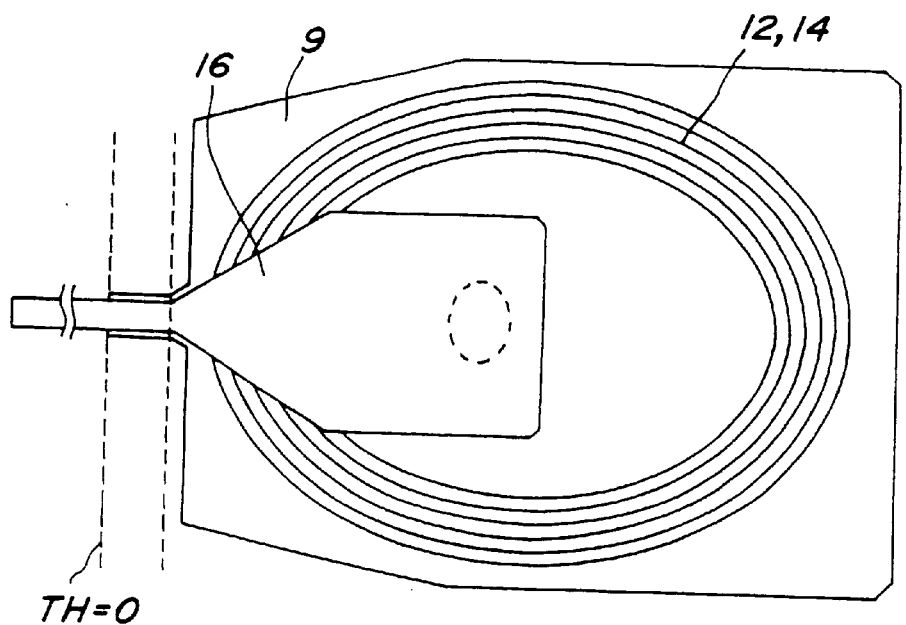

FIG._17A 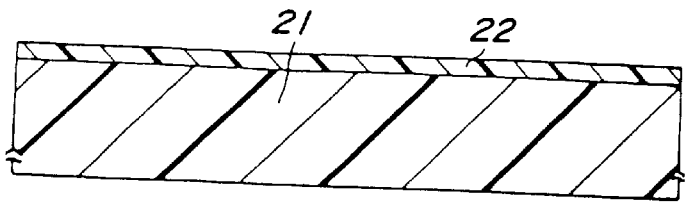 FIG._17B 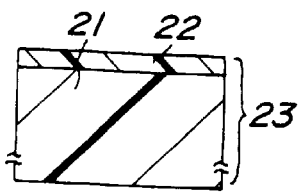
FIG._18A 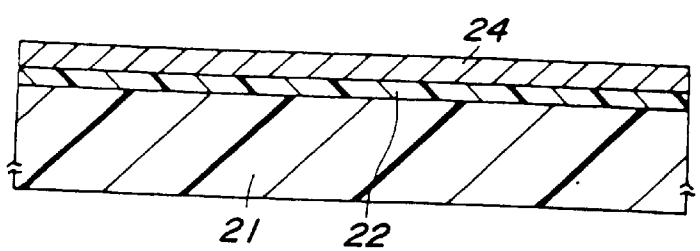 FIG._18B 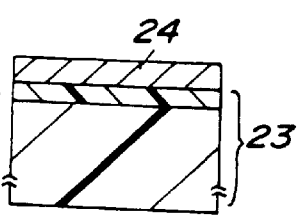
FIG._19A 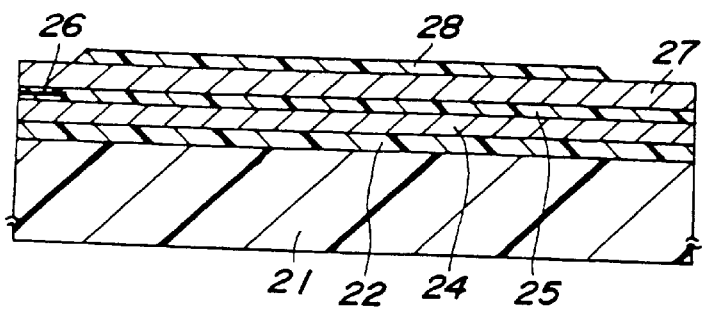 FIG._19B 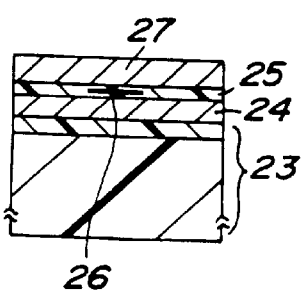
FIG._20A 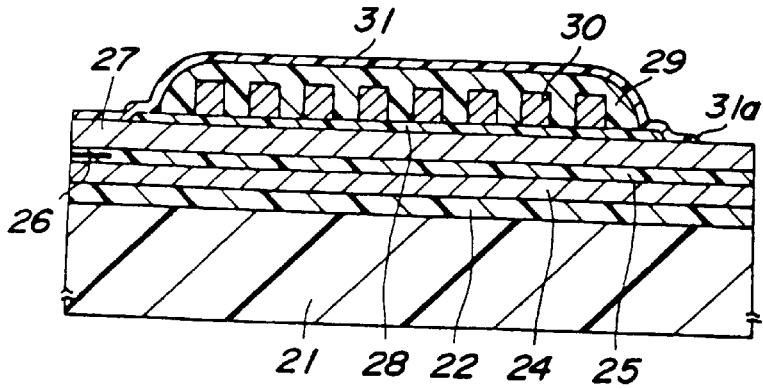 FIG._20B 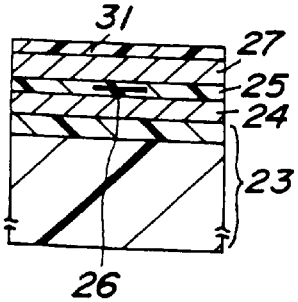

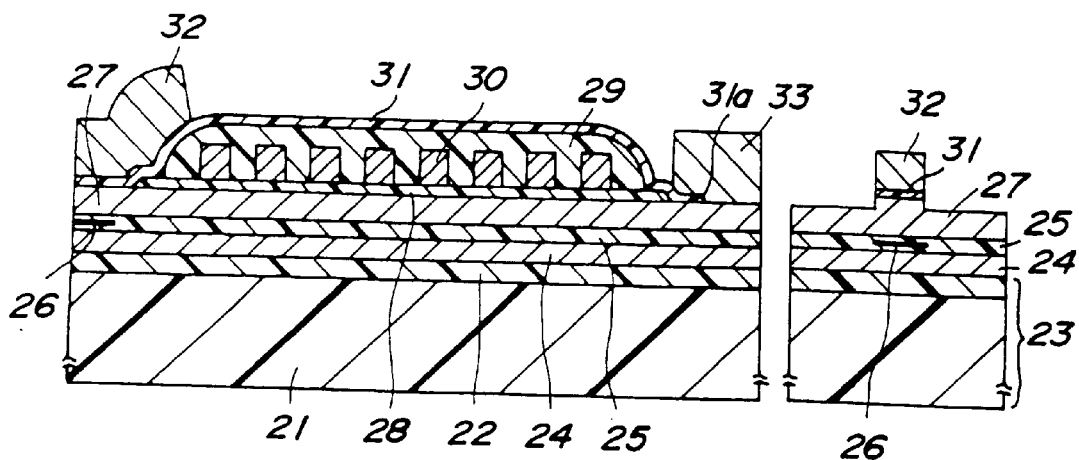
FIG._21A    FIG._21B
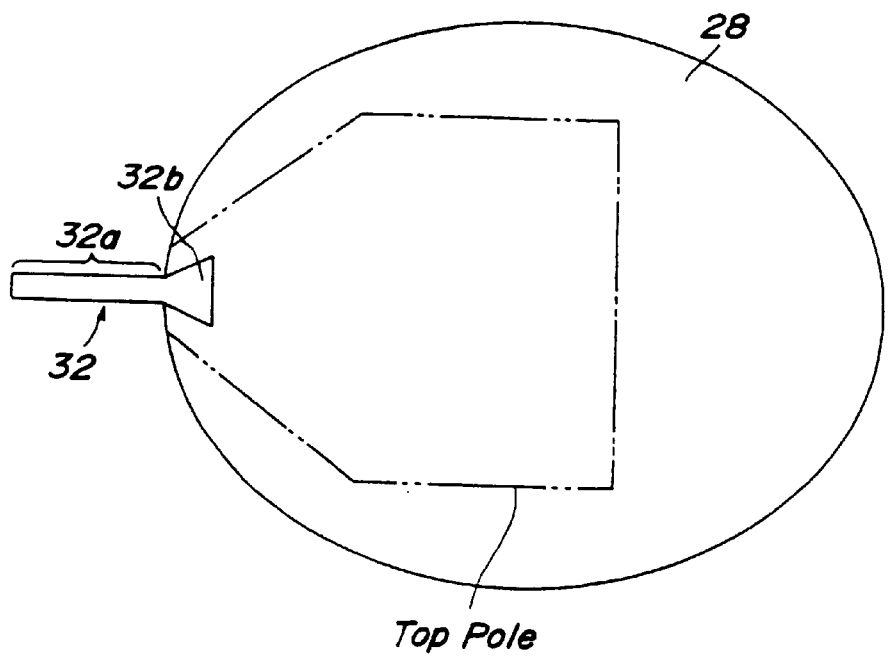
FIG._22
Top Pole

FIG._23A
FIG.23B
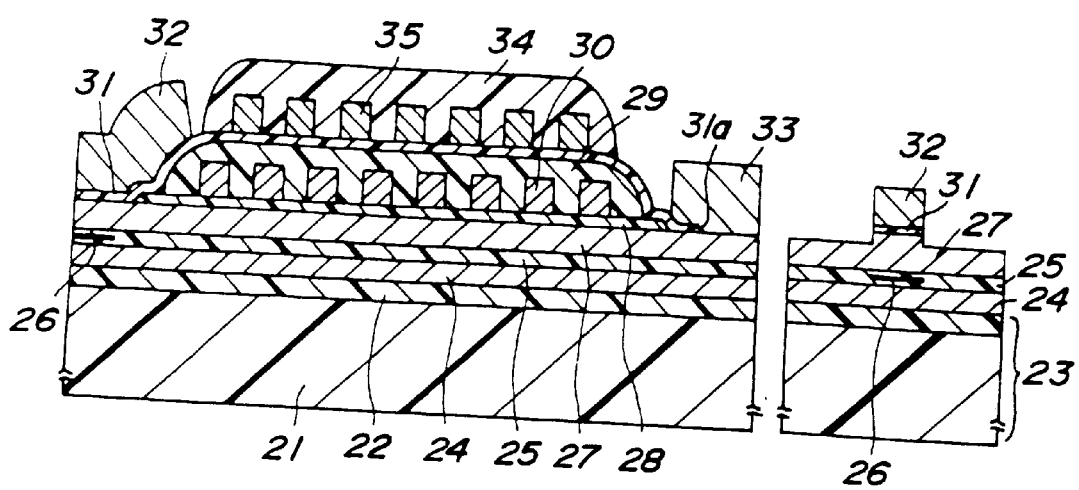
FIG._24A
FIG._24B
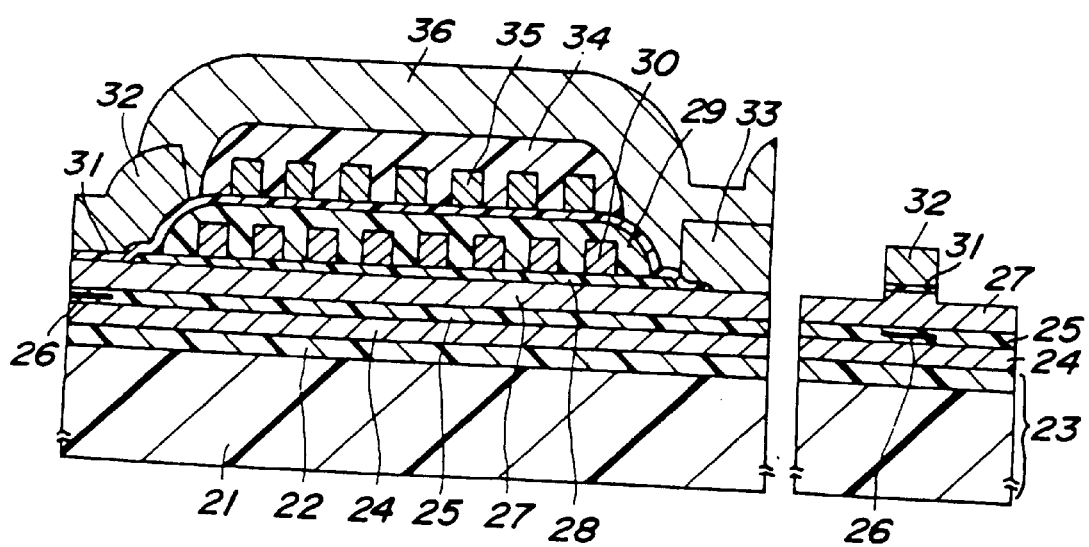

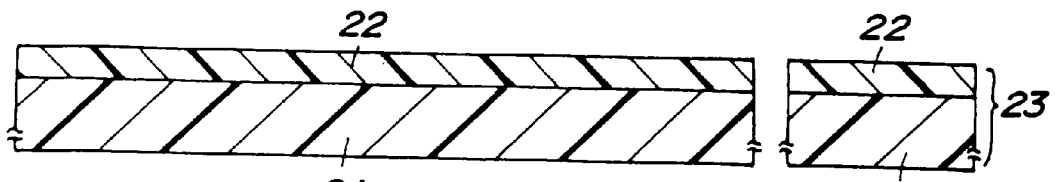
FIG.\_28A  FIG.\_28B
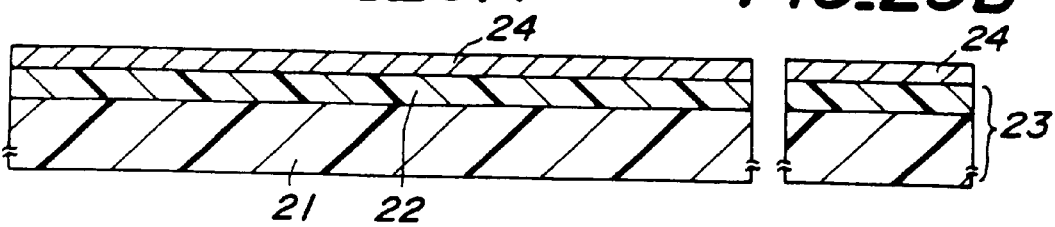
FIG.\_29A  FIG.\_29B
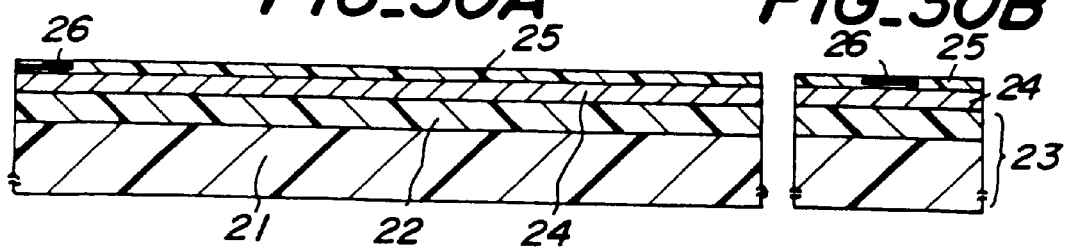
FIG.\_30A  FIG.\_30B
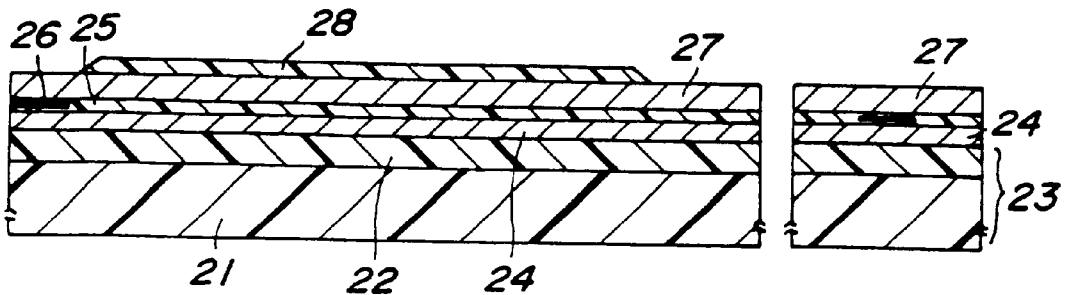
FIG.\_31A  FIG.\_31B

FIG_32
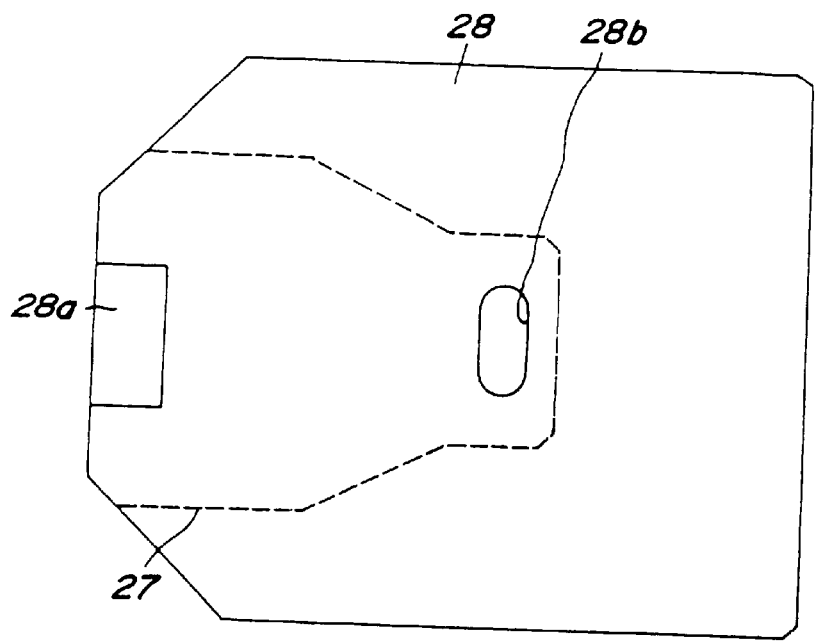
FIG_33A  FIG_33B
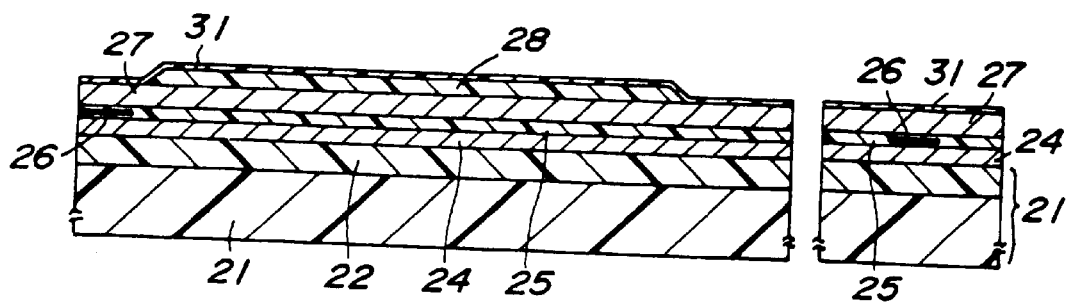

FIG._37A
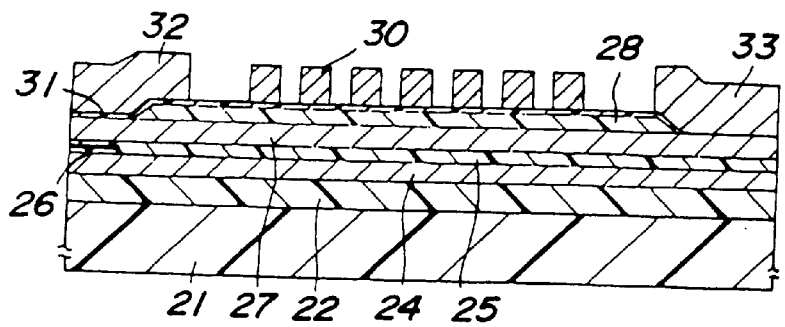
FIG._37B
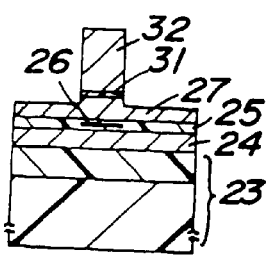
FIG._38A
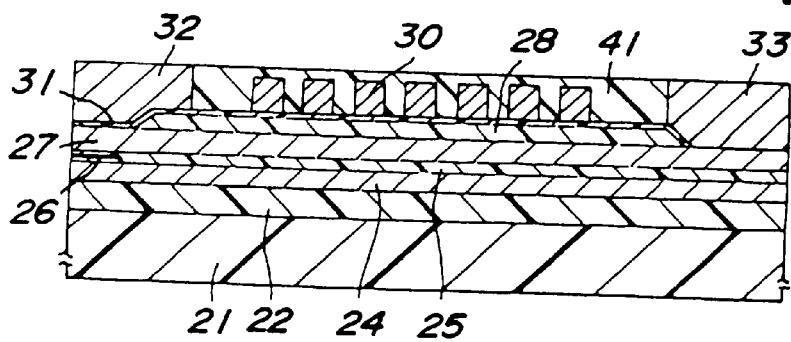
FIG._38B
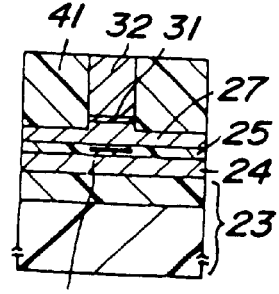
FIG._39A
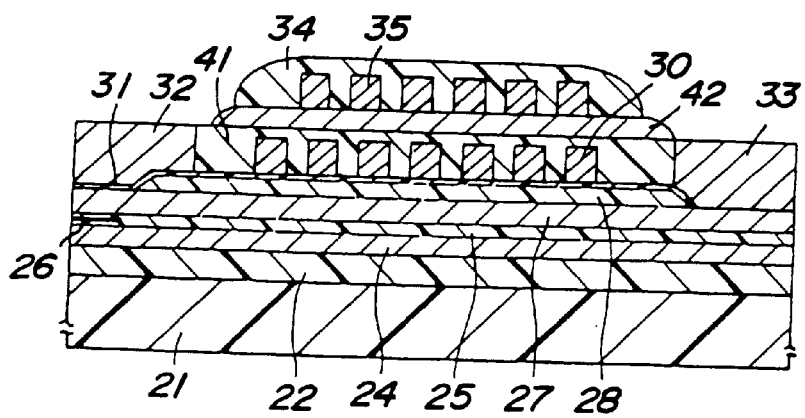
FIG._39B
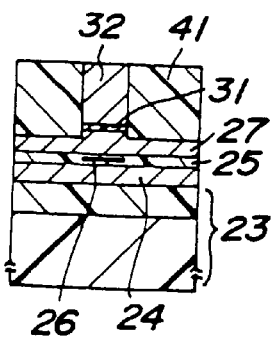

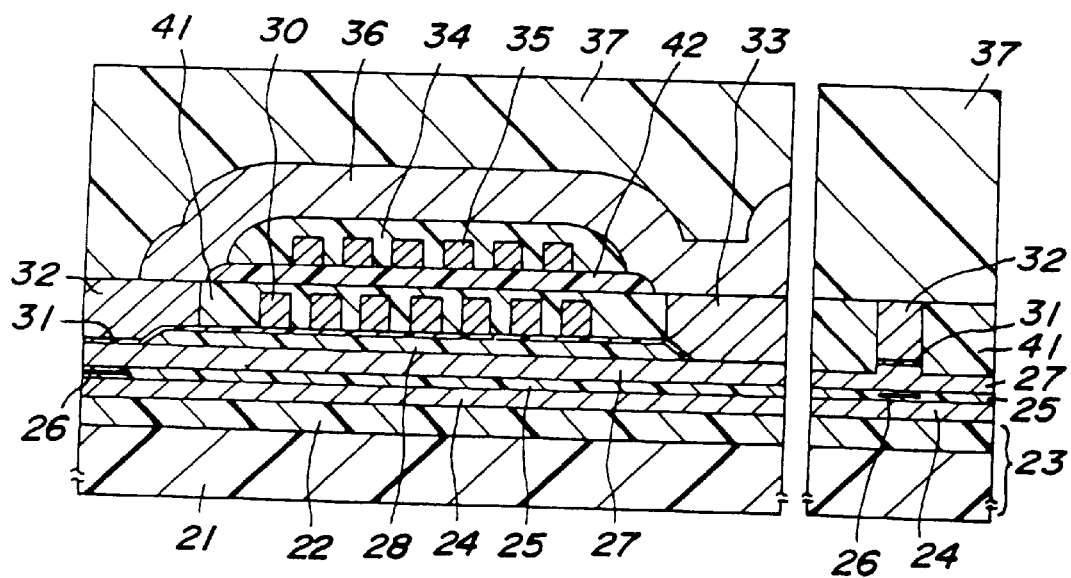
FIG_40A  FIG_40B

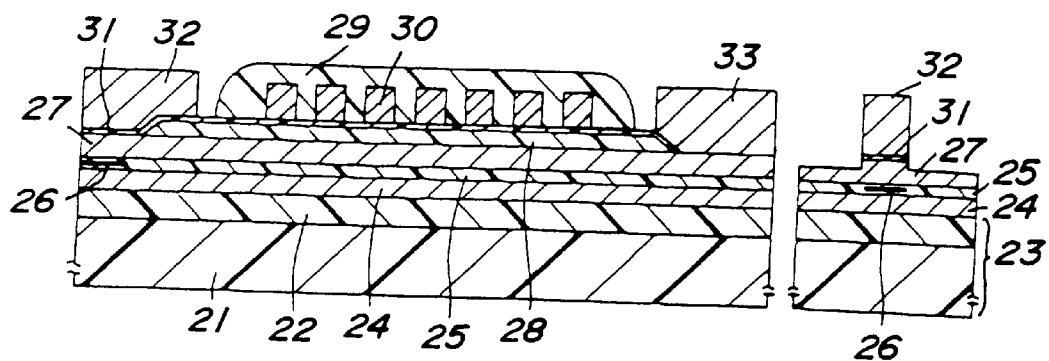
FIG_41A  FIG_41B
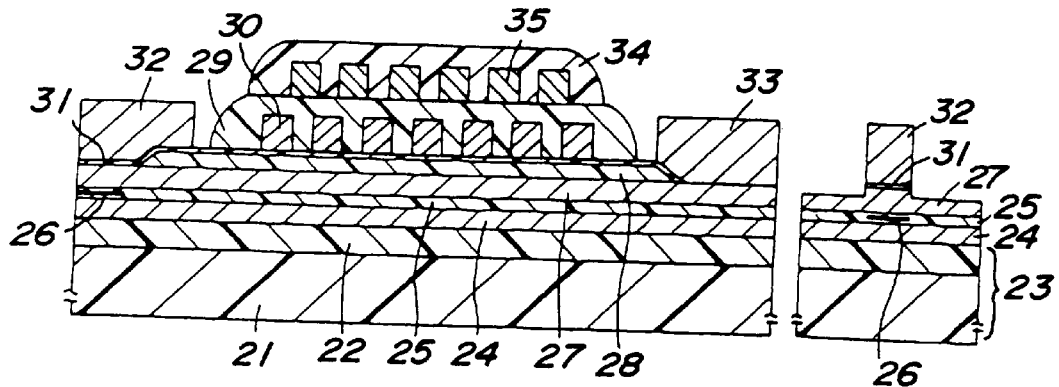
FIG_42A  FIG_42B
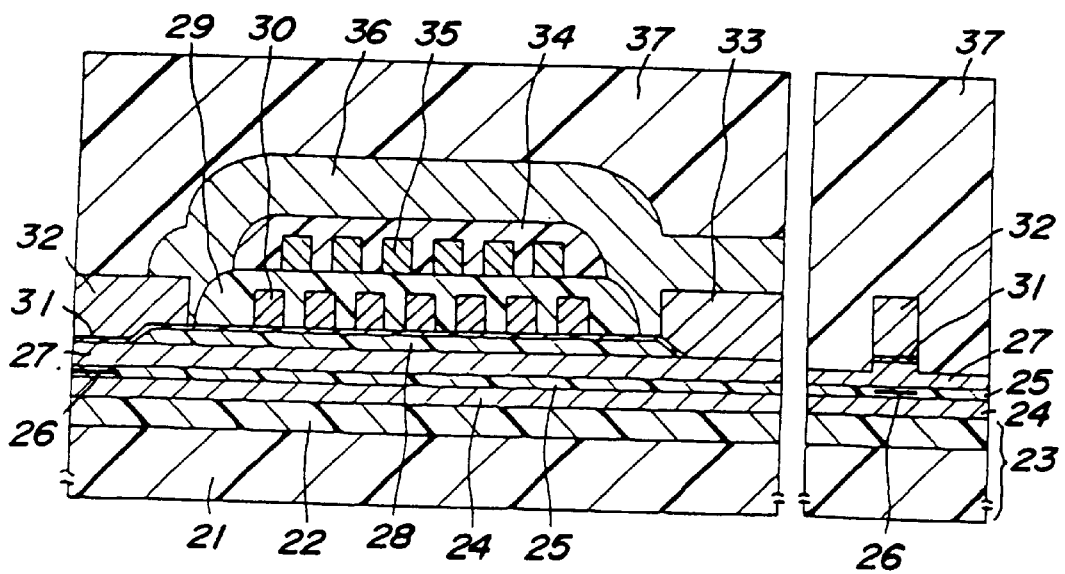
FIG_43A  FIG_43B

THIN FILM MAGNETIC HEAD AND METHOD OF MANUFACTURING THE SAME

This is a division of application Ser. No. 09/292,946 filed Apr. 16, 1999, now U.S. Pat. No. 6,317,289.

BACKGROUND OF THE INVENTION

1. Field of Invention

The present invention relates to a thin film magnetic head for writing and a method of manufacturing the same, and more particularly relates to a combination type thin film magnetic head including an inductive type thin film magnetic head for writing and a magnetoresistive type magnetic head for reading, said magnetic heads being supported by a substrate in a stacked fashion.

2. Description of Related Art

Recently a surface recording density of a hard disc device has been improved, and it has been required to develop a thin film magnetic head having an improved performance accordingly.

There has been proposed and actually used a combination type thin film magnetic head including an inductive type thin film magnetic head for writing and a magnetoresistive type magnetic head for reading, said magnetic heads being supported by a substrate in a stacked fashion. As the reading magnetic head utilizing the magnetoresistive effect, there has been generally used a reading magnetic head utilizing an anisotropic magnetoresistive (AMR) effect, but there has been also developed a magnetic head utilizing a giant magnetoresistive (GMR) effect having a resistance change ratio higher than the normal anisotropic magnetoresistive effect by several times.

In the present specification, these AMR and GMR elements are termed as a magnetoresistive type thin film magnetic head or simply MR reproducing element.

By using the AMR reproducing element, a very high surfacerecording density of several gigabits per a unit square inch has been realized, and a surface recording density can be further increased by using the GMR element. By increasing a surface recording density in this manner, it is possible to realize a hard disc device which has a very large storage capacity of more than 10 gigabytes and is still small in size.

A height (MR Height: MRH) of a magnetoresistive reproducing element is one of factors which determine a performance of a reproducing head including a magnetoresistive reproducing element. This MR height MRH is a distance measured from an air bearing surface on which one edge of the magnetoresistive reproducing element is exposed to the other edge of the element remote from the air bearing surface. During a manufacturing process of the magnetic head, a desired MR height MRH is obtained by controlling an amount of polishing the air bearing surface.

At the same time, a performance of a recording head has been also required to be improved. In order to increase a surface recording density, it is necessary to make a track density on a magnetic record medium as high as possible. For this purpose, a width of a pole portion at the air bearing surface has to be reduced to a value within a range from several micron meters to several submicron meters. In order to satisfy such a requirement, the semiconductor manufacturing process has been adopted for manufacturing the thin film magnetic head.

One of factors determining a performance of an inductive type thin film magnetic film for writing is a throat height (TH). This throat height TH is a distance of a pole portion measured from the air bearing surface to an edge of an insulating layer which serves to separate electrically a thin film coil from the air bearing surface. It has been required to shorten this distance as small as possible. Also this throat height TH is determined by an amount of polishing the air bearing surface.

In order to improve the performance of the combination type thin film magnetic head including a stack of an inductive type thin film magnetic head for writing and a magnetoresistive type thin film magnetic head for reading, it is important that the inductive type thin film magnetic head for writing and magnetoresistive type thin film magnetic head for reading are formed with a good balance.

FIGS. 1–11 show successive steps of manufacturing a known typical thin film magnetic head, in which A represents a cross sectional view cut along a plane perpendicular to the air bearing surface and B denotes a cross sectional view cut along a plane parallel with the air bearing surface. FIGS. 12–14 are a cross sectional view illustrating a completed thin film magnetic head, a cross sectional view of the pole portion, and a plan view depicting the whole magnetic head. This magnetic head belongs to a combination type thin film magnetic head which is constructed by stacking an inductive type thin film writing magnetic head and a magnetoresistive type thin film reading magnetic head one on the other.

At first, as illustrated in FIG. 1, on a substrate 1 made of, for instance aluminum-titan-carbon (AlTiC), is deposited an insulating layer 2 made of alumina ($Al_2O_3$) and having a thickness of about 5–10 μm.

Then, as depicted in FIG. 2, a first magnetic layer 3 constituting one of magnetic shields for protecting the MR reproducing magnetic head from external magnetic fields is formed to have a thickness of 3 μm on the insulating layer.

Then, after depositing by sputtering a shield gap layer 4 made of an alumina with a thickness of 100–150 nm as shown in FIG. 3, a magnetoresistive layer 5 having a thickness of several tens nano meters and being made of a material having the magnetoresistive effect, and the magnetoresistive layer is shaped into a desired pattern by a highly precise mask alignment.

Next, as represented in FIG. 4, a second shield gap layer 6 made of an alumina is formed to embed the magnetoresistive layer 5 within the shield gap layers 4, 6.

Next, as shown in FIG. 5, a second magnetic layer 7 made of a permalloy and having a thickness of 3 μm is formed. This magnetic layer 7 serves not only as the other shield layer (top shield) for magnetically shielding the MR reproducing element together with the above mentioned first magnetic layer 3, but also as one of poles (bottom pole) of the inductive type writing thin film magnetic head to be manufactured later.

Next, after forming, on the second magnetic layer 7, a write gap layer 8 made of a nonmagnetic material such as alumina to have a thickness of about 200 nm and a given pattern. After forming a magnetic layer made of a magnetic material having a high saturation magnetic flux density such as permalloy (Ni 50%: Fe 50%) and iron nitride (FeN), this magnetic layer is shaped into a given pattern by a highly precise mask alignment to form a pole chip 9. A width W of the pole chip 9 defines a track width. Therefore, in order to attain the high surface recording density, it is necessary to narrow the width W of the pole chip 9 as small as possible.

During the formation of the pole chip 9, a dummy pattern 9' for connecting the second magnetic layer 7 constituting the bottom pole with a third magnetic layer 16 constituting the top pole is formed. This dummy pattern, makes the formation of a through hole easy after mechanical polishing or chemical-mechanical polishing (CMP).

Then, in order to prevent an increase of an effective track width, that is, in order to prevent a spread of a magnetic flux at the lower pole during a writing operation, the gap layer 8 and second magnetic layer 7 constituting the bottom pole in a vicinity of the pole chip 9 are removed by an ion beam etching such as an ion milling. This condition is shown in FIG. 5, and the thus formed structure is called a trim structure, and the trim structure constitutes a pole portion of the second magnetic layer.

Furthermore, as depicted in FIG. 6, an insulating layer 10 made of an alumina is formed to have a thickness of about 3 μm, and then an assembly is flattened by CMP. Then, after forming an electrically insulating photoresist layer 11 in accordance with a given pattern by a highly precise mask alignment, a first layer thin film coil 12 made of, for instance a copper is formed on the insulating layer 11.

Next, as depicted in FIG. 7, after forming an insulating photoresist layer 13 on the first layer thin film coil 12 by a highly precise mask alignment, a surface of the photoresist layer is flattened by baking at a temperature of, for instance 250–300° C.

A reason for forming the photoresist layers 11, 13 and 15 by a highly precise mask alignment is that the throat height TH and MR height are determined with respect to edges of these photo-resist layers on a side of the pole portion.

Next, as shown in FIG. 9, a third magnetic layer 16 made of, for instance a permalloy is formed selectively on the pole chip 9 and photoresist layers 11, 13 and 15 such that the third magnetic layer has a thickness of 3 μm and is shaped into a desired pattern.

The third magnetic layer 16 is brought into contact with the second magnetic layer 7 at a position remote from the pole portion by means of the dummy pattern 9', and therefore the thin film coil 12, 14 pass through a closed magnetic path constituted by the second magnetic layer, pole chip and third magnetic layer.

Furthermore, an overcoat layer 17 made of an alumina is deposited on an exposed surface of the third magnetic layer 16.

Finally, a side wall at which the magnetoresistive layer 5 and gap layer 8 are formed is polished to form an air bearing surface (ABS) 18.

During the formation of the air bearing surface 18, the magnetoresistive layer 5 is also polished to obtain an MR reproducing element 19. In this manner, the above mentioned throat height TH and MR height MRH are determined by the polishing. This condition is shown in FIG. 10. In an actual manufacturing process, contact pads for establishing electrical connections to the thin film coils 12, 14 and MR reproducing element 19 are formed, but these contact pads are not shown in the drawings. FIG. 11 is a cross sectional view showing the pole portion of the thus manufactured combination type thin film magnetic head along a plane parallel with the air bearing surface 18.

As shown in FIG. 10, an angle θ between a straight line S connecting side edges of the photoresist layers 11, 13, 15 isolating the thin film coils 12, 14 and an upper surface of the third magnetic layer 16 is called an apex angle. This apex angle is one of important factors for determining a property of the thin film magnetic head together with the throat height TH and MR height MRH.

Furthermore, as shown in the plan view of FIG. 12, the width W of the pole chip 9 determines a width of tracks recorded on a record medium, and therefore it is necessary to make this width W as small as possible in order to realize a high surface recording density. The third magnetic layer 16 also has a narrow pole portion which is coupled with the pole chip 9, but its width is somewhat larger than the width of the pole chip 9. It should be noted that in the drawing, the thin film coils 12, 14 are denoted to be concentric for the sake of simplicity.

In the known method of manufacturing the thin film magnetic head, there is a special problem in the formation of the top pole after the formation of the thin film coil in a precise manner along the outwardly protruded coil portion, particularly along an inclined portion (Apex) thereof, said coil portion being covered with the photoresist insulating layers. That is to say, in the known method, upon forming the third magnetic layer, after a magnetic material such as permalloy is deposited by plating on the outwardly protruded coil portion having a height of about 7–10 μm, a photoresist is applied to have a thickness of 3–4 μm, and then the photoresist layer is shaped into a given pattern by utilizing the photolithography. Since a thickness of the photoresist layer provided on the upper portion of the coil portion should be at least 3 μm, the photoresist layer has to be applied such that a portion of the photoresist at a bottom of the outwardly protruded coil portion would have a thickness of about 8–10 m.

On the other hand, in order to form a narrow track of the recording head near the edges of the photoresist insulating layers (for instance, layers 11 and 13 in FIG. 7), the top pole should be patterned to have a width of about 1 μm. Therefore, it is necessary to form a pattern having a width of 1 μm in the photoresist layer having a thickness of 8–10 μm.

However, when such a narrow pattern having a width of 1 μm is to be formed with the thick photoresist layer having a thickness of 8–10 μm, a top pole which can realize a narrow track could hardly be manufactured accurately due to a deformation of a pattern by light reflection during a light exposure in a photolithography and an inevitable decrease in a resolution caused by a large thickness of the photoresist layer.

In order to mitigate such a problem, as shown in FIGS. 1–12, the top pole is divided into the pole chip 9 and the yoke portion (third magnetic layer 16) connected therewith, and the width W of the pole chip 9 is narrowed to decrease a width of the record track width.

However, the thin film magnetic head, particularly the recording magnetic head formed in the above mentioned manner still has the following problems.

If there is an alignment error in the photolithography for forming the third magnetic layer 16 on the pole chip 9 having the narrow width W, a center of the pole chip 9 and a center of the pole portion 20 of the third magnetic layer 16 viewed from the air bearing surface 18 might be shifted relative to each other. If the center of the pole chip 9 is deviated from the center of the pole portion 20 of the third magnetic layer 16, there might be produced a large leakage of the magnetic flux from the pole portion of the third magnetic layer and data might be written by this leaked magnetic flux. Therefore, an effective track width is increased and data might be recorded in a region other than a desired region into which the data has to be recorded.

The surface of the pole chip 9 is coupled with the surface of the third magnetic layer. In order to make the width W of the pole chip narrow as explained above and in order to attain a good magnetic property, a length of the pole chip has to be short such as about 1 μm. Therefore, a contact area of the pole chip and third magnetic layer is small. Moreover, the third magnetic layer is brought into contact with the pole chip perpendicularly, and thus a magnetic flux is liable to be saturated at this portion, a writing property, particularly a magnetic flux rise time is degraded.

In the known thin film magnetic head, the edge of the pole chip 9 opposite to the air bearing surface 18 is used as a reference position of throat height zero. However, since the pole chip has the small width W, the edge of the pole chip is rounded off and therefore a position of the edge of the pole chip might be shifted. In the conventional combination type thin film magnetic head, although the throat height TH and MR height MRH have to be set accurately with reference to the throat height zero position, since the reference position of throat height zero might deviate during the manufacturing process and could not be defined accurately, the thin film magnetic head having desired throat height TH and MR height MRH according to the desired design values could not be manufacture with a high yield.

In the known thin film magnetic head so far explained, there is provided the pole chip 9, but it has been also known a thin film magnetic head having no pole chip. FIG. 13 is a cross sectional view showing such a thin film magnetic head while the overcoat layer is removed, and FIG. 14 is a cross sectional view depicting the pole portion. Furthermore, FIG. 15A shows a condition before forming the trim structure by using the third magnetic layer 16 constituting the top pole as a mask, and FIG. 15B is a plan view after the formation of the trim structure. In these drawings, portions similar to those shown in FIGS. 1–12 are denoted by the same reference numerals used in FIGS. 1–12.

As depicted in FIG. 15, a pole portion of the third magnetic layer 16 has a narrow width W, and since a width of a track on a magnetic record medium is defined by said width W, the width W should be as small as possible in order to realize a high surface recording density.

In this manner, also in the thin film magnetic head without the pole chip, the above mentioned problems equally occur in the miniaturization of the pole portion of the top pole. That is to say, in order to miniaturize the pole portion of the inductive type thin film magnetic head as well as to improve the magnetic characteristics, it is required to make the throat height HT and MR height MRH as small as possible, but in the conventional combination type thin film magnetic head, it is quite difficult to form the small throat height TH and MR height MRH to have designed values.

The throat height TH and MR height MRH have to be formed accurately with reference to the position of throat height zero, however in the known combination type thin film magnetic head, there is a problem that the reference position of throat height zero could not be set accurately. That is to say, the insulating layers 13, 15 covering the thin film coils 12, 14 are made of a photoresist, and the insulating layers are subject to the reflow at a temperature about 250° C. in order to flatten the thin film coils and to isolate coil windings and the pattern and dimension of the insulating layers might fluctuate. As a result of this, the throat height TH and MR height which are formed with reference to the position of the edges of the insulating layers might deviate from design values. Particularly, when the photoresist constituting the insulating layers 13, 15 is thick, a deviation of the pattern might amount to a very large value such as about 0.5 μtm. Therefore, a fine throat height of order of submicron which is required for a high frequency thin film magnetic head could not be formed in a highly reproducible manner. Moreover, a variation in a thickness of the insulating layers 13, 15 also results in the deformation of the pattern, and a thin film magnetic head having desired throat height TH and MR height MRH could not be manufactured with a high yield.

In the known combination type thin film magnetic head, the polishing of the air bearing surface is carried out by monitoring a resistance value of the GMR reproducing element such that the polishing is continued until the resistance value becomes a given value, and a dimension of the throat height is not measured at all. However, even if the MR height MRH has a desired value, the throat height TH could not have a desired value and many magnetic heads could not be manufactured correctly. Particularly, when the reference position of throat height zero deviates due to the deformation of the pattern of the insulating layers 13, 15, the throat height TH is not formed to have a desired value, even if the MR height MRH is formed to have a desired value.

Moreover, also in the conventional thin film magnetic head illustrated in FIGS. 13–16, in order to make the effective track width substantially identical with a width of the pole portion of the third magnetic layer 16 constituting the top pole, the surface of the second magnetic layer 7 constituting the bottom pole is partially removed by performing the etching using the pole portion of the third magnetic layer 16 to form the trim structure. During this etching, i.e. ion beam etching, the insulating layers 13, 15 made of a photoresist are also etched and the edges of these insulating layers 13, 15 on the side of the air bearing surface are retarded by a distance of about 1.0–1.5 μm. The edges of the insulating layers 13, 15 on the side of the air bearing surface define the above mentioned reference position of throat height zero, and this reference position of throat height zero fluctuates by the etching and the throat height could not be formed to have a desired design value. Particularly, in the high frequency thin film magnetic head having the short throat height TH not larger than 1 μm, the fact that the position of the edges of the insulating layers 13, 15 on the side of the air bearing surface over a distance of about 1.0–1.5 μm results in a very serious problem.

Furthermore, since the position of the edges of the insulating layers 13, 15 on the side of the air bearing surface are retarded during the etching for forming the trim structure, a part 20 of the insulating layer underneath the pole portion of the third magnetic layer 16 might be damaged as shown in FIG. 16 due to a handling shock during the wave process, and in an extreme case, a part of the insulating layers 13, 15 might be pealed-off. When a part of the insulating layers 13, 15 is pealed-off and a space is formed, oil and polishing liquid might penetrate into this space, and the third magnetic layer 16 might be etched and its property might be deteriorated.

SUMMARY OF THE INVENTION

The present invention has for its object to provide a thin film magnetic head having a throat height TH of a desired design value.

It is another object of the invention to provide a combination type thin film magnetic head having a throat height TH and MR height MRH accurately corresponding to desired design values and a good balance between the throat height TH and the MR height MRH can be obtained.

It is another object of the invention to provide a thin film magnetic head having a pole chip, in which a surface area at a contact with the pole chip and a top pole can be increased, and therefore a leakage of magnetic flux at this portion can be reduced and good characteristics can be obtained.

It is another object of the invention to provide a thin film magnetic head, in which a fluctuation in the reference position of throat height zero can be suppressed, and the result of this the throat height can have a desired design value.

It is another object to provide a thin film magnetic head, a defect due to the retardation of an insulating layer by etching for forming the trim structure can be removed and a good property can be obtained.

It is another object of the invention to provide a method of manufacturing the thin film magnetic head having the above mentioned superior characteristics in an accurate manner with a high yield.

According to a first aspect of the invention, a thin film magnetic head comprises:
- a first magnetic layer having a pole portion;
- a second magnetic layer having a pole portion whose end surface constitutes an air bearing surface together with said pole portion of the first magnetic layer, said pole portion of the second magnetic layer extending from the air bearing surface to a position near a reference position of throat height zero and having a width defining a width of a record track on a magnetic record medium to be opposed to the air bearing surface;
- a third magnetic layer which is brought into contact with said second magnetic layer on a side opposite to said first magnetic layer and is magnetically coupled with said first magnetic layer at a rear position remote from the air bearing surface;
- a write gap layer interposed between said pole portion of the first magnetic layer and said pole portion of the second magnetic layer at least at the air bearing surface;
- a thin film coil having a portion which is supported by an insulating material in an electrically isolated manner between said first magnetic layer and said second and third magnetic layers; and
- a substrate supporting said first, second and third magnetic layers, write gap layer and thin film coil;
- wherein said second magnetic layer comprises a pole portion extending from the air bearing surface to a position near the throat height zero position and a connecting portion extending from said pole portion in a direction opposite to said air bearing surface, and said third magnetic layer is brought into contact with at least a surface and side walls of said connecting portion of the second magnetic layer.

In the thin film magnetic head according to the invention, since the third magnetic layer is coupled with said connecting portion of the second magnetic layer constituting the pole portion not only at the surface but also at the side walls, and thus a contact surface area can be increased. Therefore, a leakage of a magnetic flux at this portion can be suppressed. Furthermore, when the third magnetic layer is brought into contact with an end face of the connecting portion of the second magnetic layer, a contact surface area can be further increased. Moreover, a width of the connecting portion of the second magnetic layer may be larger than a width of the pole portion. For instance, the connecting portion may be gradually widened toward backward like a triangle shape. Then, a contact area on the surface can be further increased and an alignment error between the second magnetic layer and the third magnetic layer can be allowed to some extent.

Further, in the thin film magnetic head according to the invention, an insulating layer made of an inorganic insulating material such as alumina, silicon oxide and silicon nitride is provided between the first magnetic layer and the thin film coil, and the reference position of throat height zero is defined by an edge of said inorganic insulating layer on the side of the air bearing surface. By providing such an inorganic insulating layer, a fluctuation in the reference position of throat height zero during the manufacturing process can be avoided, and therefore a thin film magnetic head having a throat height identical with a desired design value.

According to the invention, a method of manufacturing a thin film magnetic head according to the first aspect of the invention comprises the steps of:
- forming a first magnetic layer having a pole portion extending at least from an air bearing surface such that the first magnetic layer is supported by a substrate;
- forming a band-shaped insulating layer on said first magnetic layer, said insulating layer having at least a portion whose edge defines a reference position for an air bearing surface;
- forming a thin film coil on a surface of said first magnetic layer such that the thin film coil is supported by an insulating layer in an insulated and isolated manner;
- forming a write gap layer such that said pole portion of the first magnetic layer and said insulating layer supporting the thin film coil in an insulated and isolated manner are covered with the write gap layer;
- forming a second magnetic layer on said write gap layer, said second magnetic layer having a pole portion extending from the air bearing surface to a position near a reference position of throat height zero and a connecting portion extending from the pole portion in a direction opposite to the air bearing surface; and
- forming a third magnetic layer on the insulating layer supporting the thin film coil in an insulate and isolated manner such that the third magnetic layer is coupled with at least a surface as well as side walls of said connecting portion of the second magnetic layer.

In a preferable embodiment of the method of manufacturing a thin film magnetic head according to the invention, after forming the second magnetic layer constituting the top pole, the write gap layer near the pole chip is removed by the reactive ion etching using a Freon or chlorine gas, while the pole chip is used as a mask, and then an exposed portion of the first magnetic layer is removed over a part of its thickness by the ion beam etching using an argon gas.

According to a second aspect of the invention, a thin film magnetic head comprises:
- a substrate;
- a first magnetic layer supported by said substrate;
- an inorganic insulating layer formed on a surface of said first magnetic layer opposite to said substrate, made of an inorganic insulating material, extending from an air bearing surface inwardly, and having a cut-out portion having a width of a pole portion;
- a write gap layer extending along said first magnetic layer and inorganic insulating layer and being superposed on said pole portion at said cut-out portion of the inorganic insulating layer;
- a thin film coil formed along a surface of said write gap layer opposite to said substrate such that the thin film coil is superposed on the inorganic insulating layer in an insulated and isolated manner; and
- a second magnetic layer extending from the surface of write gap layer opposite to the substrate along said inorganic insulating layer and thin film coil and being magnetically coupled with said first magnetic layer at a rear portion remote from the air bearing surface;

wherein said first magnetic layer has a thinner portion within said cut-out portion to form a trim structure.

In the thin film magnetic head according to the second aspect of the invention, it is preferable that said inorganic insulating layer is made of an inorganic insulating material such as alumina, silicon oxide and silicon nitride. By using such an inorganic insulating material, a position of an edge of the insulating layer on the side of the air bearing surface, i.e. the reference position of throat height zero is not fluctuated during the etching process for forming the trim structure, and therefore the throat height TH can be set to a desired design value.

A method of manufacturing a combination type thin film magnetic head having an inductive type thin film magnetic head supported by a substrate according to the second aspect of the invention comprises the steps of:

forming a first magnetic layer extending from an air bearing surface such that the first magnetic layer is supported by a substrate;

forming an insulating layer made of an inorganic insulating material on a surface of said first magnetic layer such that the insulating layer extends at least from the air bearing surface and includes a ⊐-shaped cut-out portion;

forming a write gap layer on the surface of said first magnetic layer;

forming a thin film coil on a surface of a portion of said write gap layer provided on said insulating layer in an insulated and isolated manner;

forming a second magnetic layer extending from the write gap layer, covering a surface of said thin film coil and being magnetically coupled with said first magnetic layer at a rear portion remote from the air bearing surface;

etching a surface of a portion of said first magnetic layer exposed within said cut-out portion of the insulating layer over a part of a thickness of the first magnetic layer to form a trim structure, while said pole portion of said second magnetic layer and said insulating layer are used as a mask;

covering a whole surface with an overcoat layer; and polishing the air bearing surface such that at least a front end of said cut-out portion of the insulating layer is exposed.

In a preferable embodiment of the method of manufacturing a thin film magnetic head according to the invention, said cut-out portion of the insulating layer is formed such that an inner edge of the cut-out portion defines a reference position of throat height zero and a depth of the cut-out portion defines a desired throat height, and said step of polishing the air bearing surface is carried out until the front end of the cut-out portion of the insulating layer is exposed. In this case, the throat height can be directly set by making a thickness of the cut-out portion identical with a desired value of the throat height.

In another preferable embodiment of the method of manufacturing a thin film magnetic head according to the invention, said cut-out portion of the insulating layer is formed such that an inner edge of the cut-out portion defines a reference position of throat height zero and a depth of the cut-out portion is larger than a desired throat height, and said step of polishing the air bearing surface is carried out using said inner edge of the cut-out portion as the reference position of throat height zero. Also in this case, since the position of throat height zero does not fluctuate, the throat height can be formed on the basis of this reference position and the throat height having a desired design value can be obtained.

Furthermore, it is preferable to conduct said step of removing the write gap layer by performing the etching using the pole portion of the second magnetic layer as a mask by a reactive ion etching using a Freon or chlorine gas, and to conduct said step of forming the trim structure by removing the surface of the first magnetic layer over a part of its thickness by an ion beam etching.

BRIEF DESCRIPTION OF THE DRAWINGS

FIGS. 1A, 1B–9A, 9B are cross sectional views showing successive steps of manufacturing a known combination type thin film magnetic head having a pole chip;

FIGS. 15A and 15B are plan views illustrating condition before and after the formation of the trim structure, respectively;

FIGS. 17A, 17B–21A, 21B are cross sectional views showing successive steps of an embodiment of the thin film magnetic head manufacturing method according to the invention;

FIG. 22 is a plan view in the step of FIG. 22;

FIGS. 23A, 23B and 24A, 24B are successive steps after the step of FIG. 21;

FIGS. 28A, 28B–31A, 31B are cross sectional views showing successive steps of a third embodiment of the method of manufacturing a combination type thin film magnetic head according to the invention;

FIG. 32 is a cross sectional view showing a step next to the step of FIG. 31;

FIGS. 33A and 33B are cross sectional views depicting a step next to the step of FIG. 31;

FIGS. 37A, 37B–40A, 40B are cross sectional views illustrating successive steps after the step shown in FIG. 35;

FIGS. 41A, 41B–43A, 43B are cross sectional views showing successive steps of a fourth embodiment of the method of manufacturing a thin film magnetic head according to the invention;

DESCRIPTION OF THE PREFERRED EMBODIMENT

Figure 10:
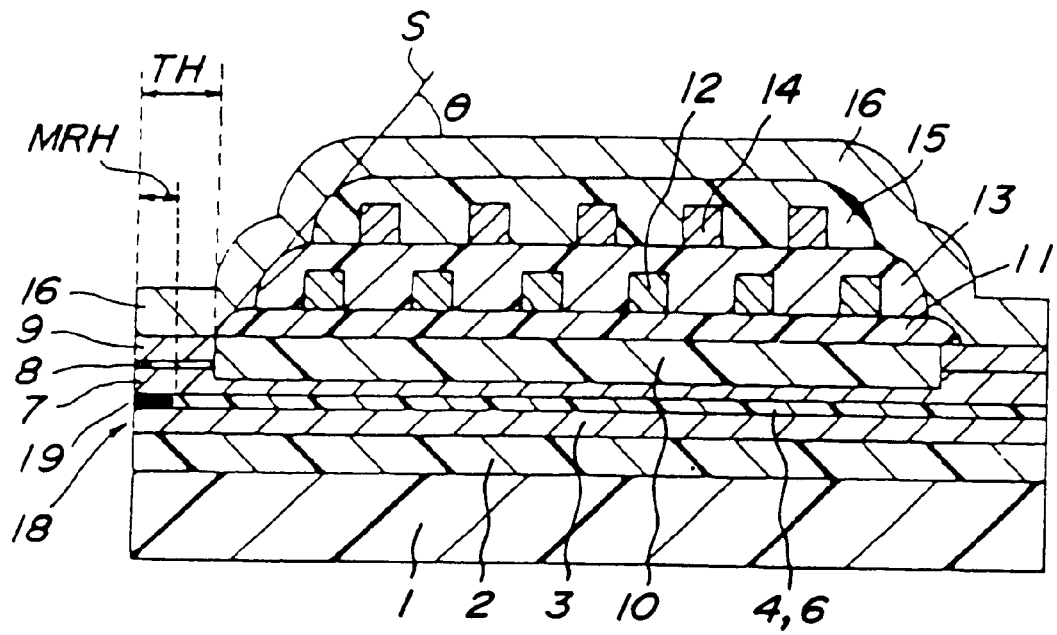
FIG. 10 is a cross sectional view of the completed known thin film magnetic head.
Figure 11:
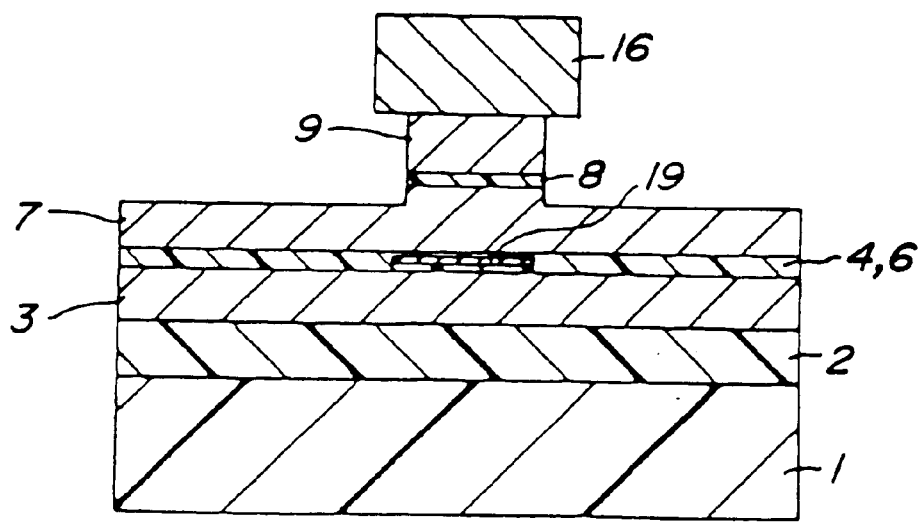
FIG. 11 a cross sectional view showing the pole portion thereof.
Figure 12:
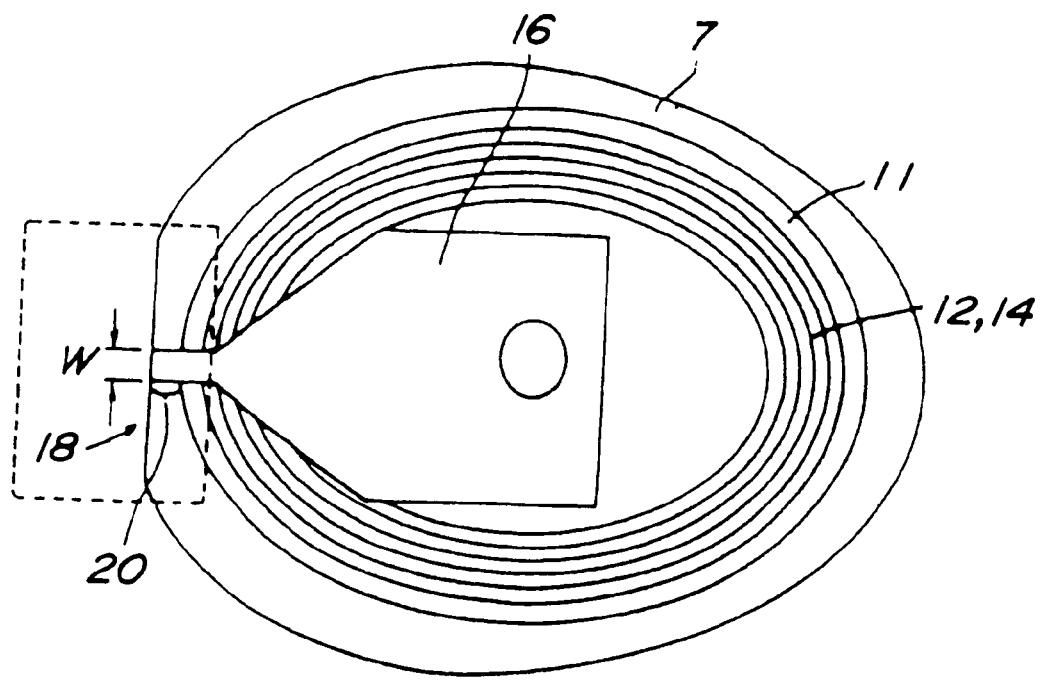
FIG. 12 is a plan view illustrating the condition at which a third magnetic layer is formed.
Figure 13:
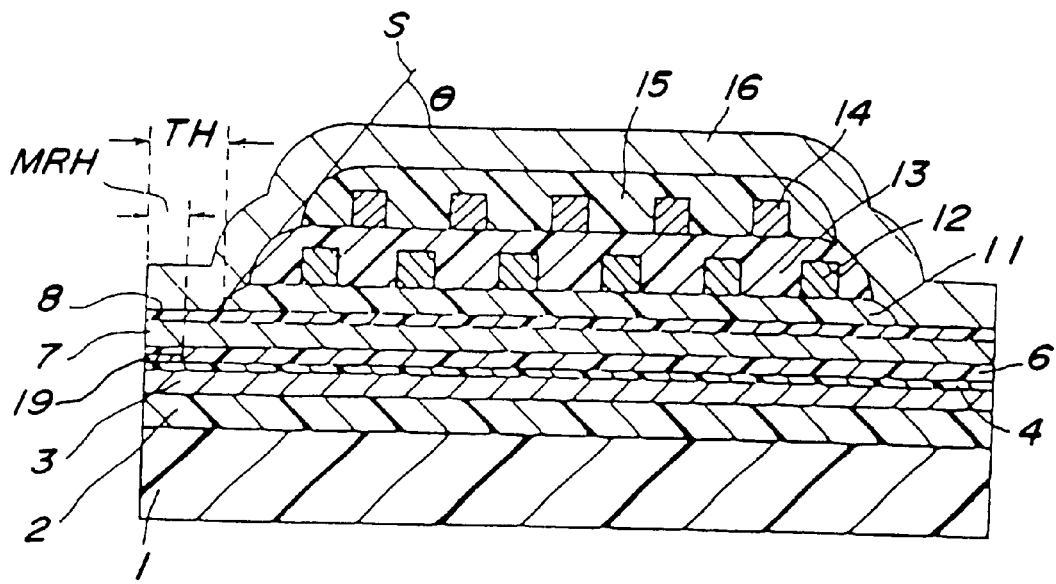
FIG. 13 is a cross sectional views showing another known combination type thin film magnetic head without a pole chip.
Figure 14:
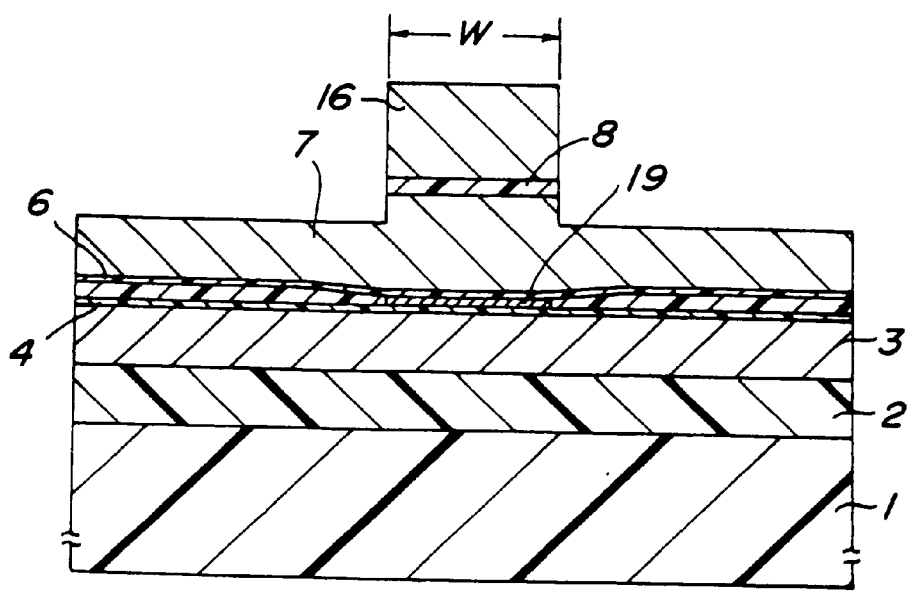
FIG. 14 is a cross sectional view of a pole portion thereof.
Figure 16:
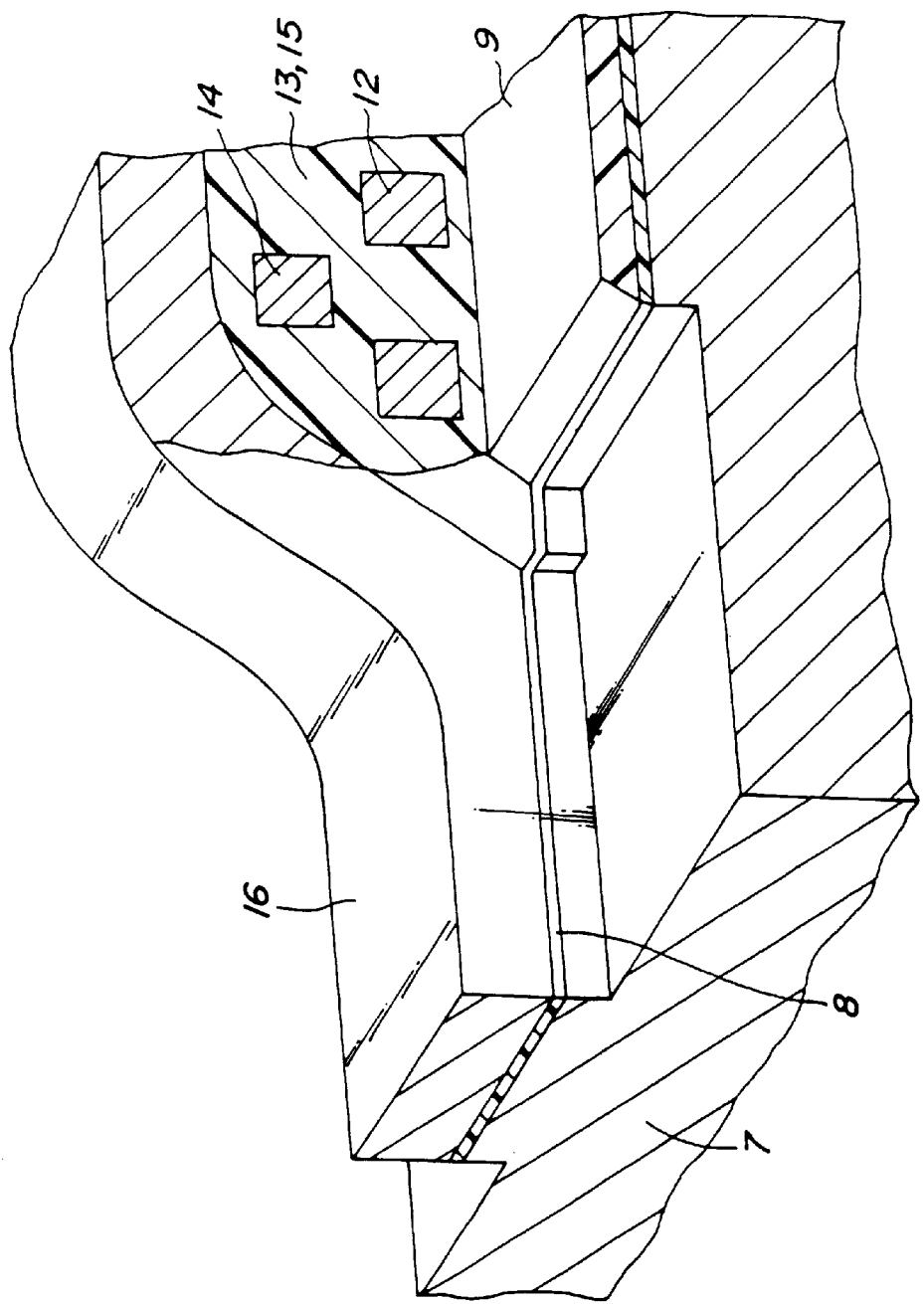
FIG. 16 is a perspective view showing the steps of FIGS. 15A and 15B.

Now a first embodiment of the method of manufacturing a thin film magnetic head according to the invention will be explained with reference to FIGS. 17–26. This thin film magnetic head is based on the first aspect of the invention. In these drawings, A is a cross sectional view cut along a plane perpendicular to the air bearing surface, and B denotes a cross sectional view cut along a plane parallel with the air bearing surface. The thin film magnetic head of the present embodiment is constructed as a combination type thin film magnetic head having a magnetoresistive type reproducing element formed on a substrate and an inductive type writing magnetic head stacked on the reproducing element.

As shown in FIG. 17, on one surface of a substrate main body 21 made of an AlTiC, is deposited an insulating layer 22 made of an alumina having a thickness of about 3–5 μm. In the present specification, the substrate main body 21 and insulating layer 22 are called a substrate or wafer 23. Moreover, in the present specification, an insulating layer means a layer having at least an electrically insulating property, and a non-magnetic property may or may not have an electrically insulating property. However, in general, the insulating layer is made of a material having an electrically insulating property as well as a non-magnetic property, and therefore an insulating layer sometimes means a non-magnetic layer.

Moreover, in an actual manufacturing process, after forming a number of combination type thin film magnetic heads on the wafer in matrix, the wafer is divided into a plurality of bars, a end face of a bar is polished to form air bearing surfaces, and finally the bar is divided into individual combination type thin film magnetic heads. In the drawings, the magnetic head is shown by cutting the wafer.

Next, as shown in FIG. 18, on the alumina insulating layer 22 of the substrate 23, a bottom shield layer 24 for the magnetoresistive type thin film magnetic head is formed with a thickness of about 3 μm by a deposition of a permalloy. This bottom shield layer 24 is formed to have a given pattern by a plating using a photoresist mask.

Next, on the bottom shield layer 24, a GMR layer 26 embedded within an insulating layer 25 made of an alumina is formed as illustrated in FIG. 19. This shield gap layer 25 may have a thickness of 0.2 μm. On a surface of the shield gap layer 25 in which the GMR layer 26 is embedded, is formed a first magnetic layer 27 made of a permalloy and having a thickness of about 3–4 μm, said first magnetic layer 27 constituting a top shield for the GMR layer as well as a bottom pole of the inductive type thin film magnetic head. Furthermore, in order to isolate this first magnetic layer 27 and a thin film coil 30 to be formed later with each other and to suppress a leakage of a magnetic flux, an insulating layer 28 made of an alumina is formed on the first magnetic layer 27 with a thickness of 0.5–2 μm. In the present embodiment, the insulating layer 28 is made of an alumina, but it may be made of an inorganic insulating material such as silicon oxide and silicon nitride.

Next, as shown in FIG. 20, on the inorganic insulating layer 28, is formed a first layer thin film coil 30 such that the thin film coil 30 is supported by an insulating layer 29 made of a photoresist in an insulated and isolated manner. After that, a write gap layer 31 made of an alumina and having a thickness of 0.1–0.3 μm is formed on exposed surfaces of the first magnetic layer 27 and insulating layer 29 in accordance with a given pattern.

Next, a second magnetic layer 32 constituting a pole chip defining a width of record tracks is formed with a thickness of about 1–4 μm by deposing a magnetic material having a high saturation magnetic flux density. This magnetic material having a high saturation magnetic flux density may be NiFe (50%, 50%), FeN and amorphous Fe-Co-Zr. The second magnetic layer 32 constituting the pole chip may be formed to have a given pattern by a plating or may be formed by dry etching a sputtered layer into a given pattern.

Moreover, during the formation of the second magnetic layer 32, a connecting magnetic layer 33 is formed to be coupled with the first magnetic layer 27 via an opening 31a formed in the write gap layer 31.

As shown in a plan view of FIG. 22, the second magnetic layer 32 constituting the pole chip includes a pole portion 32a having a narrow width and a connection portion 32b extending over the insulating film 29 supporting the first layer thin film coil 30 and having a wide width. In the present embodiment, a width of the connection portion 32b is gradually increased toward backward, but its configuration is not limited to a triangle shown in FIG. 22, but may be rectangular or pentagonal. Moreover, since a width of record tracks is determined by a width of the pole portion 32a of the second magnetic layer 32, its width is small such as 0.5–1.2 μm. It should be noted that in FIG. 22, for the sake of clarity, a third magnetic layer to be formed later as a top pole is shown by an imaginary line.

Next, a portion of the write gap layer 31 in the vicinity of the pole portion 32a is selectively removed by the reactive ion etching using a Freon gas such as $CF_4$ and $SF_6$, or a chlorine gas such as $Cl_2$ and $BCl_2$ to expose the underlying magnetic layer 27, while the pole portion 32a of the second magnetic layer 32 and the inorganic insulating layer 28 are used as a mask. Then, the exposed surface of the first magnetic layer 27 is etched over a depth of about 0.5 μm by the ion beam etching using an argon gas to form the trim structure, while the pole portion 32a of the second magnetic layer 32 and inorganic insulating layer 28 are used as a mask.

In the present embodiment, since the insulating layer 28 is made of an inorganic insulating material, an edge position of the insulating layer is neither shifted nor pealed-off during the reactive ion etching and the following ion beam milling for forming the trim structure. Therefore, the manufacturing yield and durability can be improved.

Next, a second layer thin film coil 35 is formed on the insulating layer 29 supporting the first layer thin film coil 30 in an insulated and isolated manner, said second layer thin film coil 35 being supported by a photoresist 34 in an insulated and isolated manner. In the present embodiment, there is formed a space of 2–3 μm between an end face of the pole portion 32a of the second magnetic layer 32 and a side wall of the insulating layer 34 on the side of the air bearing surface.

Next, as shown in FIG. 24, a third magnetic layer 36 is formed with a thickness of 3–4 μm in accordance with a given pattern such that a front end of the third magnetic layer on the side of the air bearing surface is connected with the pole portion 32a of the second magnetic layer 32 and an end portion of the third magnetic layer opposite to the air bearing surface is connected with the first magnetic layer 27 by means of the connecting magnetic layer 33.

Figure 25:
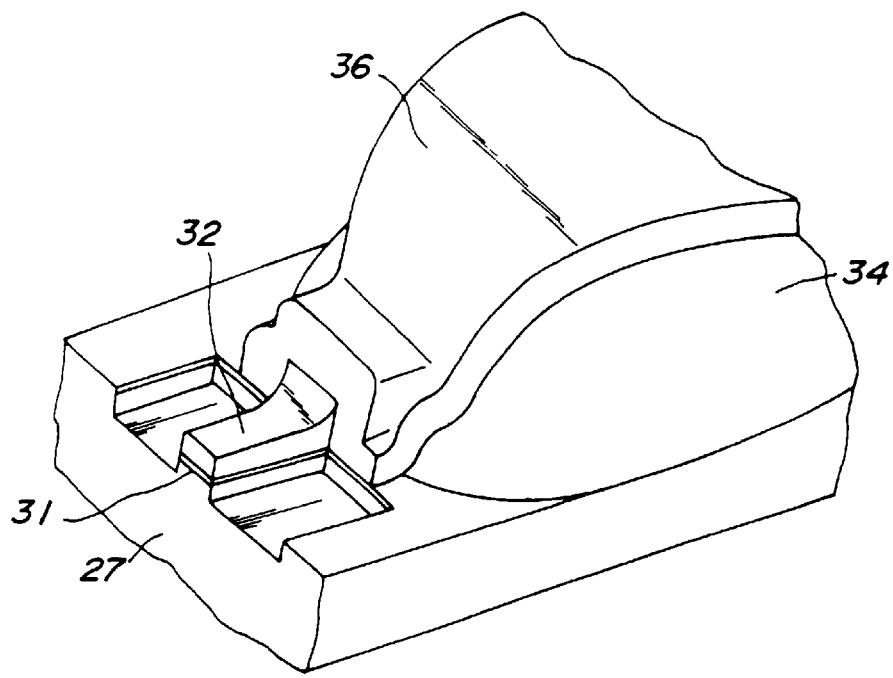
FIG. 25 is a perspective view showing the step of FIG. 24.

According to the invention, the third magnetic layer 36 is formed such that it is brought into contact not only with an upper surface of the pole portion 32a of the second magnetic layer 32, but also with both side walls and an end face of the pole portion. This condition is shown in FIG. 25. In this manner, a contact area between the second magnetic layer 32 and the third magnetic layer 36 can be widened, and thus a leakage of a magnetic flux at the connecting portion can be suppressed. This is particularly advantageous in a case, in which a width of the second magnetic layer 32 constituting the pole chip is made small such as not larger than 1 μm.

Figures 26A, 26B:
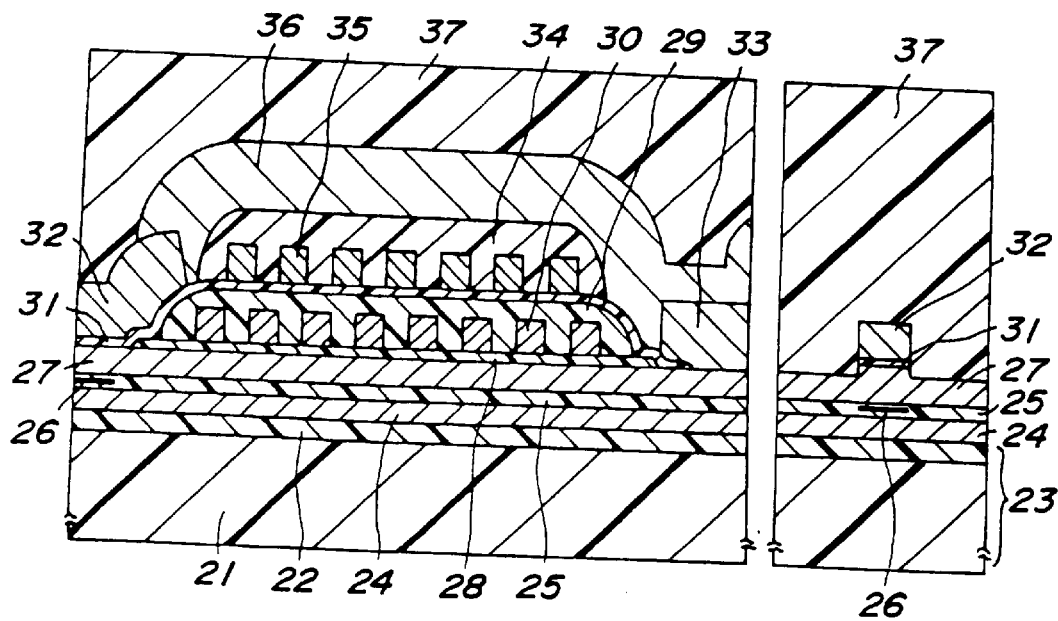
FIGS. 26A and 26B are cross sectional views illustrating a step next to the step of FIG. 24.

Further, as shown in FIG. 26, an overcoat layer 37 made an alumina is deposited on a whole surface with a thickness of 20–30 μm. As explained before, in the actual manufacturing process of the thin film magnetic head, after dividing the wafer into bars each including a number of thin film magnetic heads, a side wall of a bar is polished to form the air bearing surfaces of these magnetic heads. In the present embodiment, the edge of the inorganic insulating layer 28 on the side of the air bearing surface is set as a reference position of throat height zero and this position is not shifted during the manufacturing process, and therefore the throat height having a designed value can be easily obtained.

Figure 27:
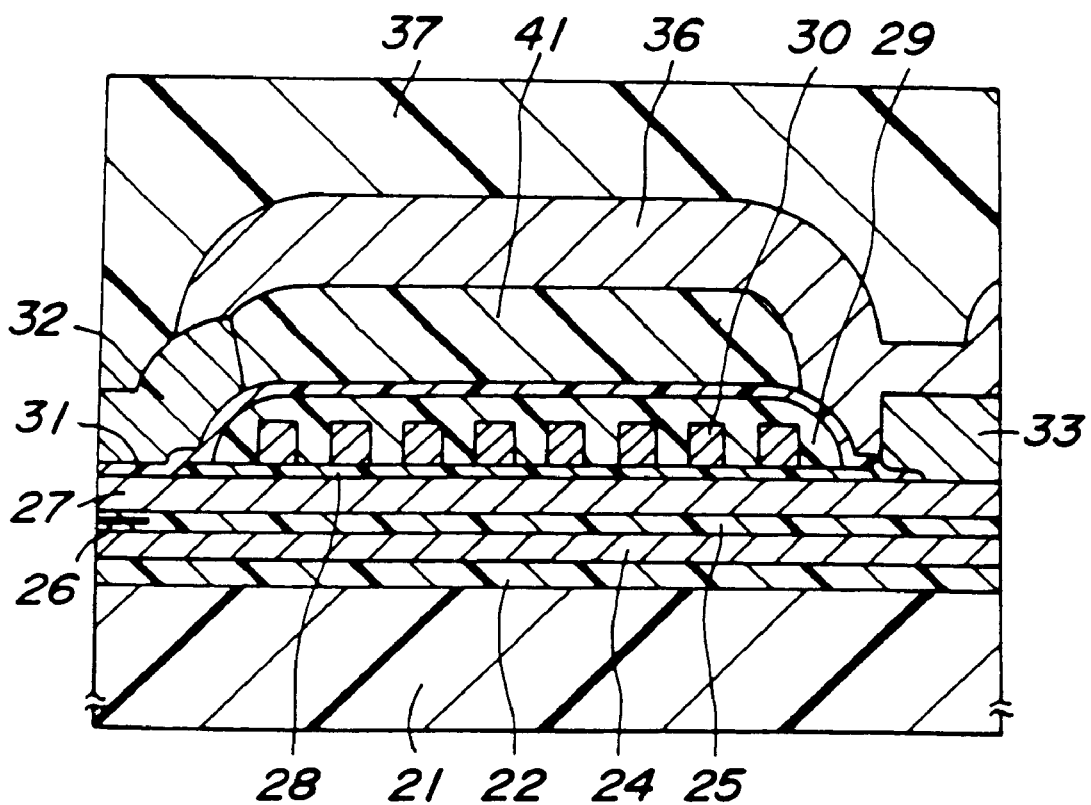
FIG. 27 is a cross sectional view depicting a second embodiment of the thin film magnetic head according to the invention.

FIG. 27 is a cross sectional view showing a second embodiment of the thin film magnetic head according to the first aspect of the invention. In the present embodiment, portions similar to those of the above mentioned first embodiment are denoted by the same reference numerals used in the first embodiment, and their explanation is omitted. In the first embodiment, the thin film coil is formed as the two layer type, but in the present embodiment, a single layer type thin film coil is used, and a thick insulating layer provided thereon. That is to say, a single layer thin film coil 30 is formed to be supported by an insulating layer 29 in an insulated and isolated manner, a write gap layer 31 is formed thereon, a second magnetic layer 32 constituting a pole chip is formed thereon, and an insulating layer 41 is formed thereon with a thickness of 2–3 μm. In the present embodiment, this insulating layer 41 is formed such that a side wall of the insulating layer on the side of the air bearing surface is brought into contact with an end face of a connecting portion 32b of the second magnetic layer 32, and therefore the third magnetic layer 36 is formed to be brought into contact with the surface as well as side walls of the connecting portion 32b of the second magnetic layer 32.

FIGS. 28–40 show successive steps of manufacturing a third embodiment of the thin film magnetic head according to the second aspect of the invention.

As shown in FIG. 28, on one surface of a substrate main body 21 made of an AlTiC, is deposited an insulating layer 42 made of an alumina having a thickness of about 3–5 μm to form a substrate 23. Next, as shown in FIG. 29, on the alumina insulating layer 22 of the substrate 23, a bottom shield layer 24 for the magnetoresistive type thin film magnetic head is formed with a thickness of about 3 μm by a deposition of a permalloy. This bottom shield layer 24 is formed to have a given pattern by a plating using a photoresist mask.

Next, as illustrated in FIG. 30, on the bottom shield layer 24, a GMR layer 26 embedded within an insulating layer 25 made of an alumina is formed. This shield gap layer 25 may have a thickness of 0.2 μm.

Furthermore, on a surface of the shield gap layer 25 in which the GMR layer 26 is embedded, is formed a first magnetic layer 27 made of a permalloy and having a thickness of 3–4 μm, said first magnetic layer constituting a top shield for the GMR layer as well as a bottom pole of the inductive type thin film magnetic head. Furthermore, an insulating layer 28 made of an inorganic insulating material such as alumina, silicon oxide and silicon nitride is formed on the first magnetic layer with a thickness of 1–2 μm. In the present embodiment, the insulating layer 28 has a side wall having a taper angle of 40–70°.

According to the invention, as illustrated in FIG. 32, a cutout portion 28a is formed in the inorganic insulating layer 28 on the side of the air bearing surface. In this embodiment, the cut-out portion 28a has a rectangular shape, but it may have any other configuration. It should be noted that in FIG. 18, the first magnetic layer 27 underlying the inorganic insulating layer 28, and within the cut-out portion 28a, the first magnetic layer is exposed. Further, within an opening 28b formed substantially at a center of the inorganic insulating layer, the first magnetic layer 27 is also exposed.

Figure 34:
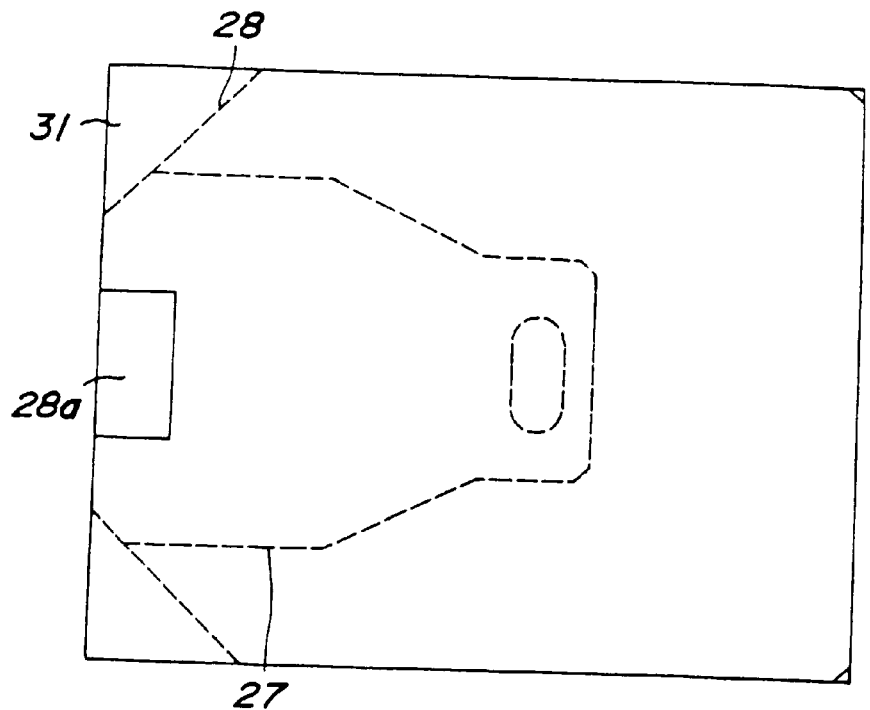
FIG. 34 is a plan view showing the step of FIG. 33.

Next, a write gap layer 31 made of an alumina and having a thickness of 0.1–0.3 μm is formed on the exposed surfaces of the first magnetic layer 28 and inorganic insulating layer 29 in accordance with a given pattern as shown in a cross sectional view of FIG. 33 as well as in a plan view of FIG. 34.

Figures 35A, 35B:
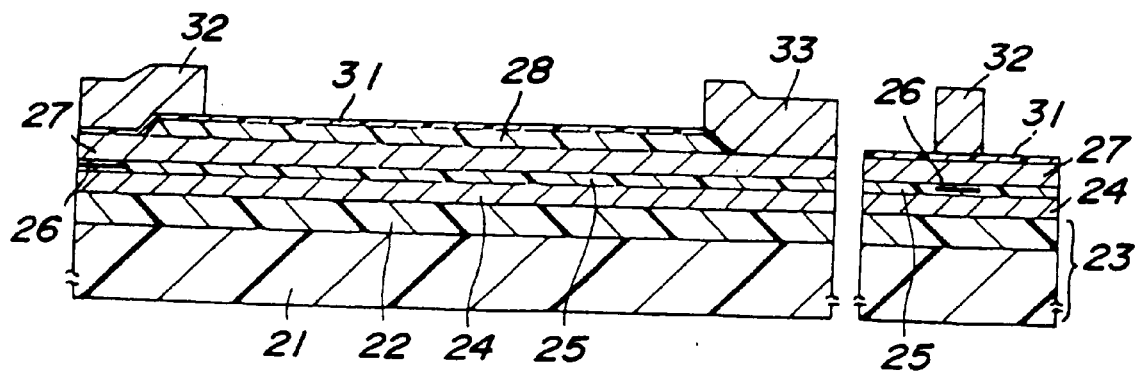
FIGS. 35A and 35B are cross sectional views depicting a step next to the step of FIG. 33.
Figure 36A:
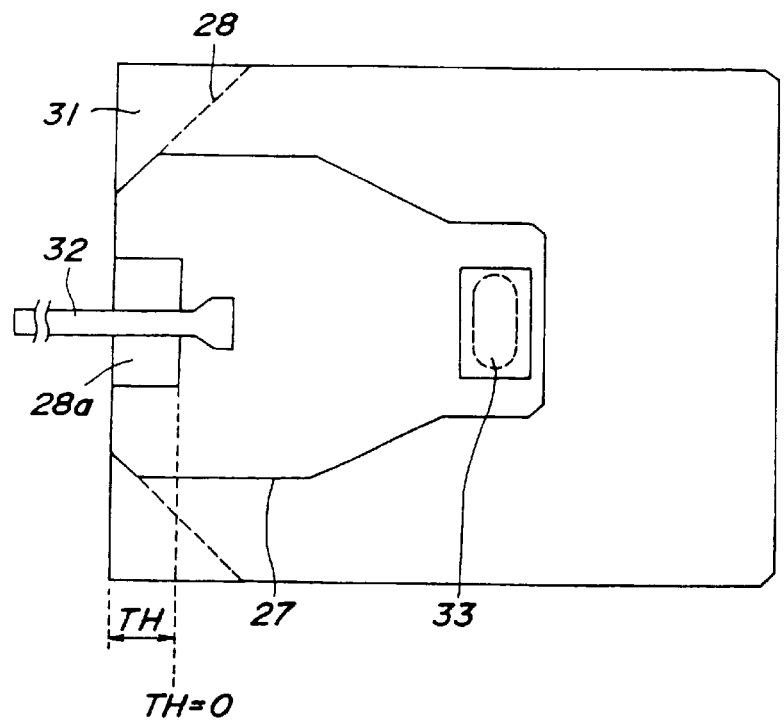
FIG. 36A is a plan view and 36B is a perspective view illustrating the step of FIG. 35.
Figure 36B:
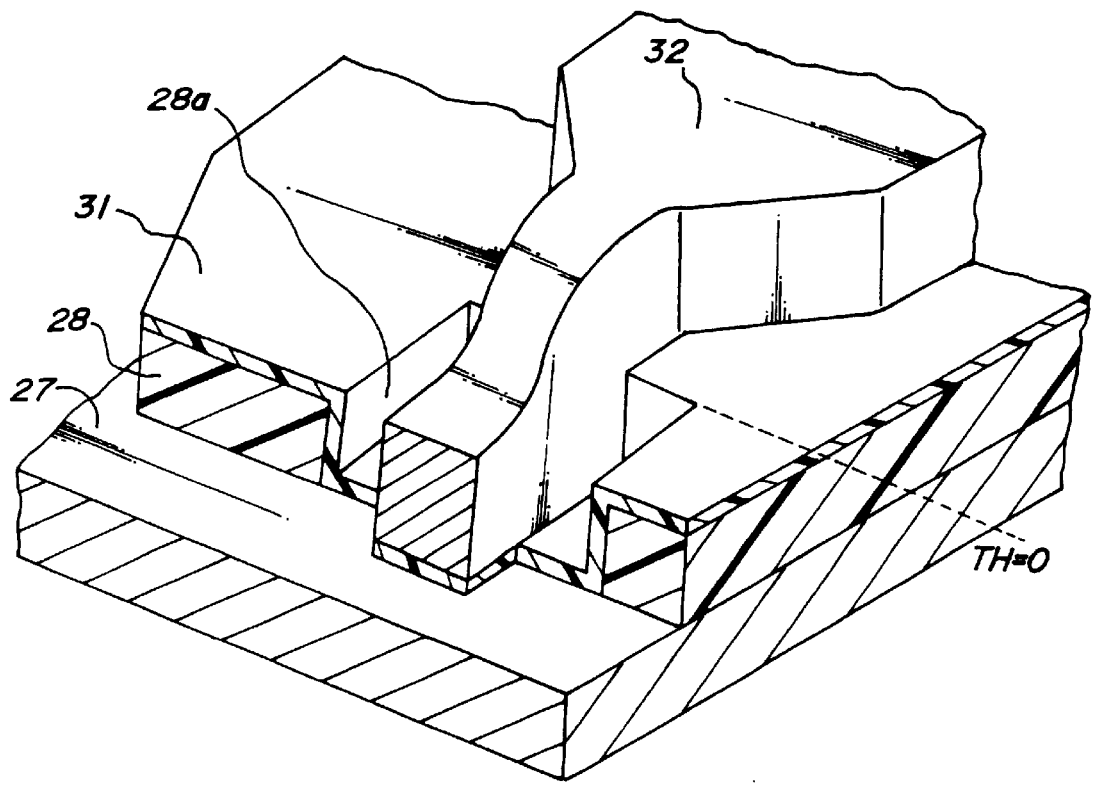

Next, after selectively removing the write gap layer 31 provided within the opening 28b of the above mentioned inorganic insulating layer 28a, a pole chip 32 defining a width of record tracks is formed with a thickness of 3–4 μm by deposing a magnetic material having a high saturation magnetic flux density, and at the same time, a connecting magnetic layer 33 coupled with the first magnetic layer within the opening 28b of the inorganic insulating layer 28 as illustrated in FIGS. 35 and 36. FIG. 35 is a plan view and FIG. 36 is a perspective view. The magnetic material having a high saturation magnetic flux density may be NiFe (50%, 50%) and FeN. The pole chip 32 may be formed to have a given pattern by a plating or may be formed by dry etching a sputtered layer into a given pattern. Since a width of record tracks is determined by a width of the pole chip 32, this width should be small such as 0.5–1.2 μm.

Next, a portion of the write gap layer 31 provided within the cut-out portion 28a of the inorganic insulating layer 28 is selectively removed by the reactive ion etching using a chlorine gas such as $Cl_2$ and $BCl_2$ or a Freon gas to expose the underlying first magnetic layer 27 within the cut-out portion 28a, while the pole chip 32 is used as a mask. Then, the exposed surface of the first magnetic layer 27 is etched over a depth of about 0.5 μm by the ion beam etching as shown in FIG. 37.

In the present embodiment, since the insulating layer 28 defining the cut-out portion 28a is made of an inorganic insulating material, an edge position of the insulating layer is not retarded during the reactive ion etching and the following ion beam milling for forming the trim structure. Therefore, the reference position of throat height zero defined by an inner edge of the cut-out portion does not fluctuate. Therefore, when a depth of the cut-out portion 28a is set to a desired throat height, this desired throat height can be automatically obtained by stopping the polishing when the front end of the cut-out portion 28a of the inorganic insulating layer 28 is just exposed, and a throat height of the order of sub-micron can be obtained accurately and easily.

FIG. 37 shows a first layer thin film coil 30 formed on the write gap layer 31 situating on the inorganic insulating layer 28. Furthermore, an alumina is deposited with a thickness of 3–5 μm in order to isolate successive coil windings of the thin film coil as well as to suppress a leakage of a magnetic flux, and then its surface is flattened by chemical-mechanical polishing (CMP) to form an insulating layer 41 as illustrated in FIG. 38. Here, the thin film coil 30 may be formed by the electroplating using a seed layer made of a copper.

Next, after forming an insulating layer 42 made of a photoresist on the flat surface of the insulating layer 41, a second layer thin film coil 35 is formed thereon such that the thin film coil is supported by an insulating layer 34 made of a photoresist in an insulated and isolated manner as shown in FIG. 39.

Next, as shown in FIG. 40, a third magnetic layer 36 constituting the upper pole is formed with a thickness of 3–4 μm in accordance with a given pattern such that a front end of the third magnetic layer on the side of the air bearing surface is connected with the pole chip 30 and an end portion opposite to the air bearing surface is connected with the connecting magnetic layer 31, and then an overcoat layer 37 made an alumina is deposited on a whole surface with a thickness of 20–30 μm. As explained before, in the present embodiment, the pole chip 30 and yoke portion 37 form the second magnetic layer. In this embodiment, since the pole chip 32 is surrounded by the inorganic insulating layer 41, the third magnetic layer 36 is brought into contact only with the upper surface of the pole chip.

As explained above, after dividing the wafer into bars, a side wall of a bar is polished to form the air bearing surfaces of these magnetic heads. In the present embodiment, since the cut-out portion 28a of the inorganic insulating layer 28 has a depth identical with a desired throat height, it is possible to automatically obtain a throat height of the desired design value by stopping the polishing when the front end of the cut-out portion is just exposed.

However, it should be noted that according to the invention, it is not limited that the cut-out portion 28a of the inorganic insulating layer 28 only to the throat height TH, but a depth of the cut-out portion 28a may be larger than the desired throat height and the polishing of the air bearing surface may be carried out with reference to the inner edge of the cut-out portion. In this case, since the position of the inner edge of the cut-out portion 28a defining the reference position of throat height zero does not fluctuate during the manufacturing process, it is possible to obtain the throat height having a desired design value.

FIGS. 41–43 are cross sectional views showing successive steps of the method of manufacturing a thin film magnetic head according to a fourth embodiment of the invention. In the above embodiment, as illustrated in FIG. 38, after forming the first layer thin film coil 30, the thin film coil and pole chip 32 are covered with the insulating layer 41 made of an inorganic insulating material such as alumina, silicon oxide and silicon nitride. In the present embodiment, as depicted in FIG. 41, after forming a first layer thin film coil 30, the thin film coil is covered with an insulating layer 29 made of a photoresist. That is to say, there is formed a space between an inner end face of the pole chip 32 and an end face of the insulating layer 29 made of a photoresist.

Next, as depicted in FIG. 42, a second layer thin film coil 35 is formed on the insulating layer 29 such that the thin film coil is covered with an insulating layer 34 made of a photoresist. Then, as shown in FIG. 43, a third magnetic layer 36 constituting the top pole is formed to be brought into contact with the pole chip 32 and connecting magnetic layer 33. In the present embodiment, since the third magnetic layer 36 is formed in the space formed between the pole chip 32 and the insulating layer 29, the third magnetic layer is brought into contact with the pole chip 32 not only at the upper surface but also at the end face as well as the side walls, and a contact area can be increased. Therefore, even if a length of the pole chip 32 is reduced, no leakage of a magnetic flux occurs at a portion between the pole chip 32 and the third magnetic layer 36. In this manner, the present embodiment has the merits of both the first and second aspects of the invention.

After forming an overcoat layer 37 made of an alumina, the wafer is divided and the air bearing surface is polished. Also in the present embodiment, since the inner edge of the cut-out portion 28a of the inorganic insulating layer 28 is set to the reference position of throat height zero, a desired throat height can be accurately and easily obtained.

Figure 44:
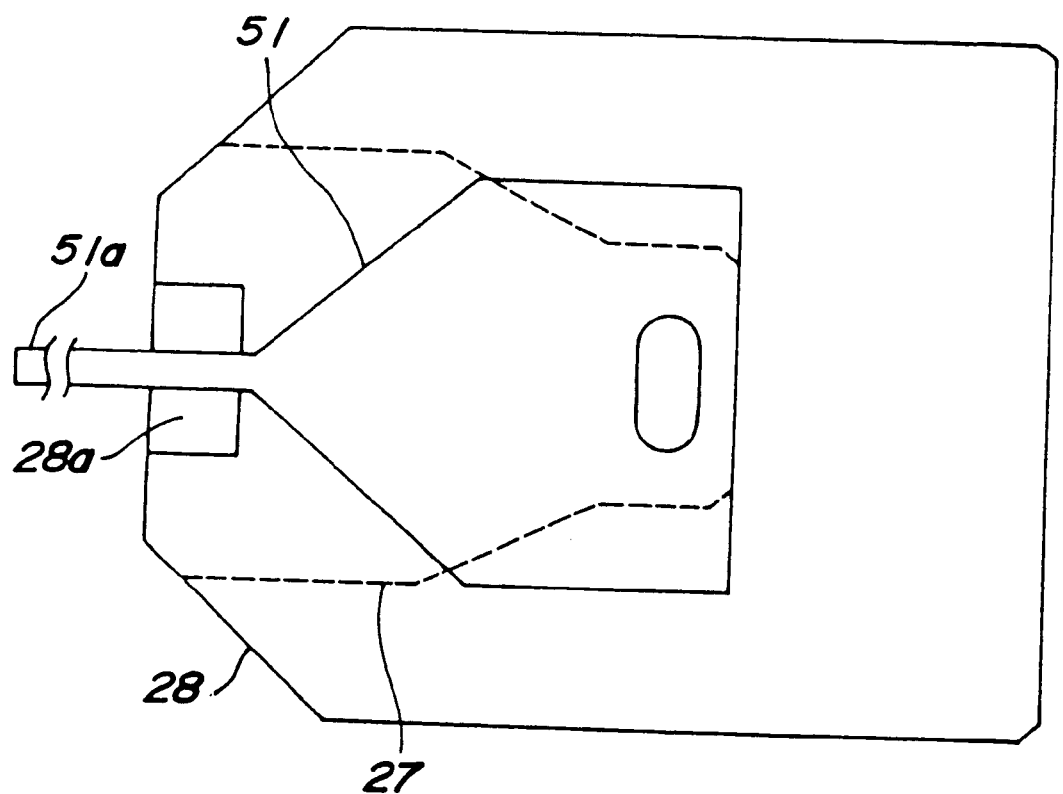
FIG. 44 is a plan view depicting a step during a fourth embodiment of the method of manufacturing a thin film magnetic head according to the invention.

FIG. 44 is a plan view of a fifth embodiment of the thin film magnetic head according to the invention in a condition prior to the formation of the overcoat layer. The above embodiment includes the pole chip 32, but in the present embodiment, a second magnetic layer 51 includes a pole portion 51a. Also in the present embodiment, a depth of the ⊐-shaped cut-out portion 28a formed in the inorganic insulating layer 28 is set to be identical with a desired throat height, the desired throat height can be automatically obtained by stopping the polishing for forming the air bearing surface when the front end of the cut-out portion is just exposed.

Figure 45:
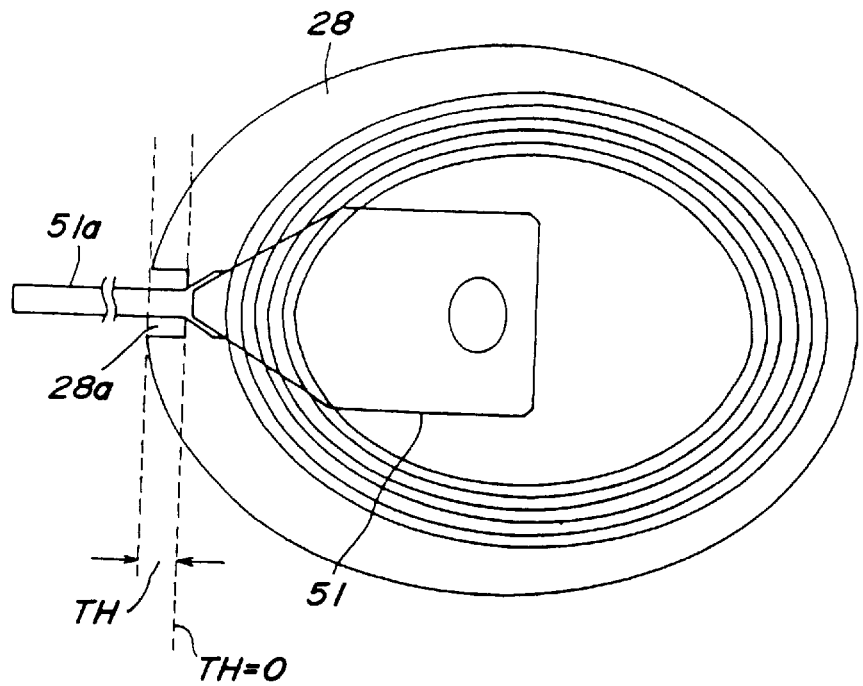
FIG. 45 is a plan view showing a configuration of an inorganic insulating layer having a cut-out portion in a fifth embodiment of the thin film magnetic head according to the invention.

FIG. 45 is a plan view of a sixth embodiment of the thin film magnetic head according to the invention in a condition prior to the formation of the overcoat layer. In the above embodiment, the side edge of the inorganic insulating layer 28 in which the cut-out portion 28a is formed is straight. In the present embodiment sown in FIG. 45, the edge of the inorganic insulating layer 28 on the side of the air bearing surface is curved and a rectangular cut-out portion 28a is formed in this curved edge. Also in the present embodiment, a depth of the cut-out portion 28a is set to be identical with a desired throat height TH (for instance 0.6 μm), the desired throat height TH can be automatically obtained by stopping the polishing for forming the air bearing surface when the front end of the cut-out portion is just exposed.

Figure 46:
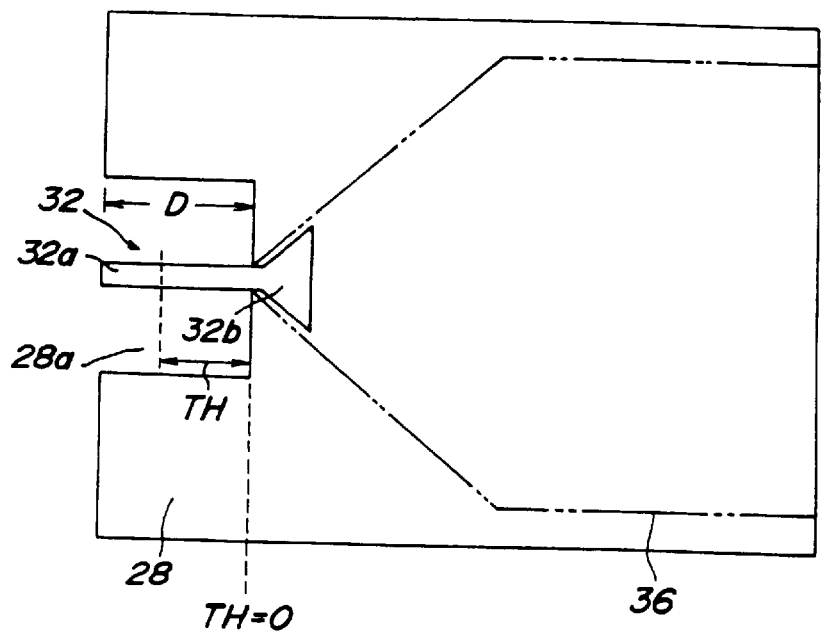
FIG. 46 is a plan view showing a configuration of an inorganic insulating layer having a cut-out portion in a sixth embodiment of the thin film magnetic head according to the invention.

FIG. 46 is a plan view of a seventh embodiment of the thin film magnetic head according to the invention in a condition prior to the formation of the overcoat layer. In the above embodiment, a depth of the cut-out portion 28a is set to be identical with a desired throat height TH, but in the present embodiment a depth of the cut-out portion 28a is set to be larger than a desired throat height TH. That is to say, when a desired throat height TH is 0.5 μm, a depth D of the cut-out portion 28a of the inorganic insulating layer 28 is 1 μm which is longer than the desired throat height. The inner edge of the cutout portion 28a is used as the reference position of throat height zero (TH=0). A pole portion 32a of a second magnetic layer 32 constituting the pole chip situates within the cut-out portion 28a and a connecting portion 32b situates above the inorganic insulating layer 28.

The present invention is not limited to the embodiments explained above, but many alternations and modifications may be conceived by those skilled in the art. For instance, in the above mentioned embodiments, the reading magnetoresistive type thin film magnetic head is provided on the substrate and the writing inductive type thin film magnetic head is stacked on the reading magnetic head, but according to the invention this stacking order may be reversed. In the above embodiments, the magnetoresistive element is formed by a GMR element, but it may be formed by an AMR element.

Moreover, according to the invention, the reading thin film magnetic head is not limited to the magnetoresistive element, but may be formed by any other thin film magnetic head. It should be further noted that the reading thin film magnetic head is not always necessary, but only the inductive type thin film magnetic head may be provided.

In the above embodiments, the rectangular cut-out portion is formed in the edge of the inorganic insulating layer on the side of the air bearing surface, but it is not always necessary to form the rectangular cut-out portion, but the cut-out portion may be pedestal or pentagonal. However, a width of the cut-out portion should be sufficiently wider that a width of the pole portion which serves as a mask for forming the trim structure, and may be about 10 μm or not less than this value.

In the thin film magnetic head according to the first aspect of the invention, the second magnetic layer constituting the pole chip is made of a magnetic material having a high saturation magnetic flux density, the front end of the third magnetic layer magnetically coupled with the second magnetic layer is retarded from the air bearing surface, and the third magnetic layer is brought into contact not only with the upper surface of the connecting portion of the second magnetic layer but also with the side walls thereof. Therefore, even if the second magnetic layer has a small dimension, a leakage of a magnetic flux from the front end of the third magnetic layer can be suppressed and a leakage of a magnetic flux at a contact portion between the second and third magnetic layers can be suppressed, and thus data can be recorded efficiently on very narrow record tracks.

In this case, by making a width of the connecting portion of the second magnetic layer wider than that of the pole portion, a contact area between the second and third magnetic layers can be further increased, and even if an alignment error occurs between the second and third magnetic layers, a leakage of a magnetic flux can be suppressed.

In the thin film magnetic head according to the second aspect of the invention, the cut-out portion is formed in the air bearing side edge of the inorganic insulating layer formed on the first magnetic layer, the write gap layer exposed within the cut-out portion is removed by etching, and removing partially the exposed surface of the first magnetic layer by etching to form the trim structure. Therefore, the edge position of the inorganic insulating layer is not retarded by the etching and the reference position of throat height zero does not fluctuate during the manufacturing process, and thus the throat height can be accurately formed on the basis of this reference position. . Therefore, the magnetic property of the thin film magnetic head and the manufacturing yield can be improved.

Furthermore, since the edge of the inorganic insulating layer is not retarded during the etching process for forming the trim structure, a portion of the insulating layer situating under the magnetic layer constituting the pole portion is hardly damaged or pealed-off or shifted, and therefore the deterioration in the property of the thin film magnetic head can be suppressed. Moreover, since the insulating layer is not pealed-off, oil and polishing agent could not be retained in a pealed-off portion and the manufacturing yield and durability can be further improved.

Furthermore, when a depth of the cut-out portion formed in the inorganic insulating layer is set to be identical with a desired throat height, this desired throat height can be automatically obtained by stopping the polishing when the front end of the cut-out portion is just exposed.

What is claimed is:

1. A method of manufacturing a combination type thin film magnetic head having an inductive type thin film magnetic head supported by a substrate comprising the steps of:

forming a first magnetic layer extending forwardly beyond an air bearing surface such that the first magnetic layer is supported by the substrate;

forming an insulating layer made of an inorganic insulating material on a surface of said first magnetic layer such that the insulating layer extends at least from the air bearing surface and includes a ⊐-shaped cut-out portion whose inner edge defines a reference position of throat height zero;

forming a write gap layer to cover an exposed surface of said first magnetic layer and a surface of said inorganic insulating layer;

forming a thin film coil on a surface of a portion of said write gap layer provided on said insulating layer in an insulated and isolated manner;

forming a second magnetic layer on at least a part of a surface of the write gap layer exposed within said cut-out portion of the inorganic insulating layer and on a surface of said thin film coil, said second magnetic layer being magnetically coupled with said first magnetic layer at a rear portion remote from the air bearing surface;

etching an exposed portion of the write gap layer within the cut-out portion to expose an underlying surface of the first magnetic layer, while a portion of said second magnetic layer provided within the cut-out portion and said inorganic insulating layer are used as a mask;

etching a surface of a portion of said first magnetic layer exposed within said cut-out portion of the insulating layer over a part of a thickness of the first magnetic layer to form a trim structure, while said portion of said second magnetic layer provided within the cut-out portion and said inorganic insulating layer are used as the mask;

covering a whole surface with an overcoat layer; and polishing the air bearing surface such that at least a front end of said cut-out portion of the insulating layer is exposed, while said inner edge of the cut-out portion is used as a positional reference.

2. The method of manufacturing a thin film magnetic head according to claim 1, wherein said cut-out portion of the inorganic insulating layer is formed such that a depth of the cut-out portion defines a desired throat height, and said step of polishing the air bearing surface is carried out until a front end of the cut-out portion of the inorganic insulating layer is exposed.

3. The method of manufacturing a thin film magnetic head according to claim 1, wherein said cut-out portion of the inorganic insulating layer is formed such that a depth of the cut-out portion is larger than a desired throat height, and said step of polishing the air bearing surface is carried out using said inner edge of the cut-out portion as a reference position of throat height zero.

4. The method of manufacturing a thin film magnetic head according to claim 1, wherein said cut-out portion of the inorganic insulating layer is formed to have a tapered inner edge.

5. The method of manufacturing a thin film magnetic head according to claim 1, wherein said step of etching the exposed portion of the write gap layer is carried out by a reactive ion etching.

6. The method of manufacturing a thin film magnetic head according to claim 5, wherein said reactive ion etching carried by using a Freon gas or chlorine gas.

7. The method of manufacturing a thin film magnetic head according to claim 1, wherein said step of etching the surface of the first magnetic layer exposed within the cut-out portion is carried out by an ion beam etching.

8. The method of manufacturing a thin film magnetic head according to claim 1, wherein after forming a magnetoresistive element embedded in a shield gap layer on the substrate, said first magnetic layer is formed on said shield gap layer to construct the thin film magnetic head as the combination type thin film magnetic head.

9. The method according to claim 1, wherein prior to forming the second magnetic layer, a pole chip is formed on a part of the surface exposed within the cut-out portion of the insulating layer, said second magnetic layer is formed such that a gap between the pole chip and the thin film coil is embedded by the second magnetic layer, and said etching is carried out using said pole chip and insulating layer as the mask.

10. The method according claim 1, wherein second magnetic layer is formed to have a pole portion provided on a part of the surface exposed within the cut-out portion of the insulating layer, and said etching is carried out using said pole portion of the second magnetic layer and the insulating layer as the mask.

* * * * *